United States Patent
Ikeda

(10) Patent No.: US 8,886,698 B2
(45) Date of Patent: Nov. 11, 2014

(54) ELECTRONIC DEVICE MONITORING METHOD, ELECTRONIC DEVICE COMPUTER AND PROGRAM THEREOF

(75) Inventor: Tatsuya Ikeda, Tokyo (JP)

(73) Assignee: Sony Corporation, Tokyo (JP)

( * ) Notice: Subject to any disclaimer, the term of this patent is extended or adjusted under 35 U.S.C. 154(b) by 1013 days.

(21) Appl. No.: 12/152,804

(22) Filed: May 16, 2008

(65) Prior Publication Data

US 2008/0235374 A1   Sep. 25, 2008

Related U.S. Application Data

(62) Division of application No. 10/451,968, filed as application No. PCT/JP02/11276 on Oct. 30, 2002, now abandoned.

(30) Foreign Application Priority Data

Oct. 30, 2001   (JP) ................................. 2001-333318

(51) Int. Cl.
*G06F 15/16* (2006.01)
*G06F 15/173* (2006.01)
*G06F 15/177* (2006.01)
*H04L 12/24* (2006.01)
*H04L 12/28* (2006.01)

(52) U.S. Cl.
CPC ........ *H04L 41/0856* (2013.01); *H04L 41/0253* (2013.01); *H04L 41/0213* (2013.01); *H04L 41/22* (2013.01); *H04L 41/0806* (2013.01); *H04L 12/2803* (2013.01); *H04L 12/2825* (2013.01); *H04L 41/022* (2013.01); *H04L 41/046* (2013.01)

USPC ........................... 709/200; 709/223; 709/220

(58) Field of Classification Search
CPC ........................................................ G06F 15/16
USPC ........................................................ 709/200
See application file for complete search history.

(56) References Cited

U.S. PATENT DOCUMENTS

| | | | |
|---|---|---|---|
| 5,541,911 A * | 7/1996 | Nilakantan et al. ........... | 370/422 |
| 5,651,006 A * | 7/1997 | Fujino et al. .................. | 370/408 |
| 5,678,042 A | 10/1997 | Pisello et al. ................... | 714/47 |
| 5,818,603 A * | 10/1998 | Motoyama ..................... | 358/296 |
| 5,913,037 A | 6/1999 | Spofford et al. .............. | 709/226 |
| 5,982,753 A | 11/1999 | Pendleton et al. ............ | 370/252 |
| 5,996,010 A | 11/1999 | Leong et al. .................. | 709/223 |

(Continued)

FOREIGN PATENT DOCUMENTS

| | | |
|---|---|---|
| EP | 0 798 904 | 10/1997 |
| EP | 0 991 229 | 4/2000 |

(Continued)

*Primary Examiner* — Hamza Algibhah
*Assistant Examiner* — James Edwards
(74) *Attorney, Agent, or Firm* — Frommer Lawrence & Haug LLP; William S. Frommer; Paul A. Levy

(57) ABSTRACT

Processing relating to maintenance of a monitoring subject device is performed by detecting by a computer an IP address of an electronic device connected to a LAN, automatically referring to communication protocol specification data indicating a communication protocol with the electronic device indicated in remote maintenance management data provided in advance or obtained from the electronic device, and performing a communication with the electronic device by using said communication protocol and the IP address indicated by the communication protocol specification data.

4 Claims, 26 Drawing Sheets

(56) References Cited

U.S. PATENT DOCUMENTS

| | | | |
|---|---|---|---|
| 5,999,179 A * | 12/1999 | Kekic et al. | 715/734 |
| 6,018,567 A * | 1/2000 | Dulman | 379/32.03 |
| 6,122,639 A | 9/2000 | Babu et al. | |
| 6,125,390 A | 9/2000 | Touboul | 709/223 |
| 6,314,476 B1 * | 11/2001 | Ohara | 710/15 |
| 6,389,464 B1 * | 5/2002 | Krishnamurthy et al. | 709/220 |
| 6,446,134 B1 | 9/2002 | Nakamura | |
| 6,574,721 B1 * | 6/2003 | Christenson et al. | 711/209 |
| 6,639,893 B1 * | 10/2003 | Chikenji et al. | 370/217 |
| 6,664,978 B1 * | 12/2003 | Kekic et al. | 715/733 |
| 6,857,013 B2 * | 2/2005 | Ramberg et al. | 709/223 |
| 6,947,964 B2 * | 9/2005 | Nishio | 709/202 |
| 6,981,036 B1 | 12/2005 | Hamada | 709/223 |
| 7,587,467 B2 * | 9/2009 | Hesselink et al. | 709/214 |
| 8,085,787 B1 * | 12/2011 | Monteiro | 370/395.52 |
| 2001/0043562 A1 * | 11/2001 | Hrastar et al. | 370/227 |
| 2001/0052006 A1 * | 12/2001 | Barker et al. | 709/223 |
| 2002/0018455 A1 * | 2/2002 | Yokoyama | 370/338 |
| 2002/0057018 A1 * | 5/2002 | Branscomb et al. | 307/42 |
| 2002/0069274 A1 | 6/2002 | Tindal et al. | 709/223 |
| 2002/0152292 A1 * | 10/2002 | Motoyama et al. | 709/223 |
| 2006/0106925 A1 * | 5/2006 | Song et al. | 709/223 |
| 2006/0129669 A1 * | 6/2006 | Kojima | 709/223 |
| 2009/0006453 A1 * | 1/2009 | Liu et al. | 707/102 |
| 2009/0077260 A1 * | 3/2009 | Bearman et al. | 709/238 |

FOREIGN PATENT DOCUMENTS

| | | |
|---|---|---|
| EP | 1 059 766 | 12/2000 |
| JP | 8-286989 | 11/1996 |
| JP | 8-316960 | 11/1996 |
| JP | 10-290247 | 10/1998 |
| JP | 10 304005 | 11/1998 |
| JP | 11 110322 | 4/1999 |
| JP | 11 234277 | 8/1999 |
| JP | 2000 35930 | 2/2000 |
| JP | 2000 172600 | 6/2000 |
| JP | 2000-194626 | 7/2000 |

* cited by examiner

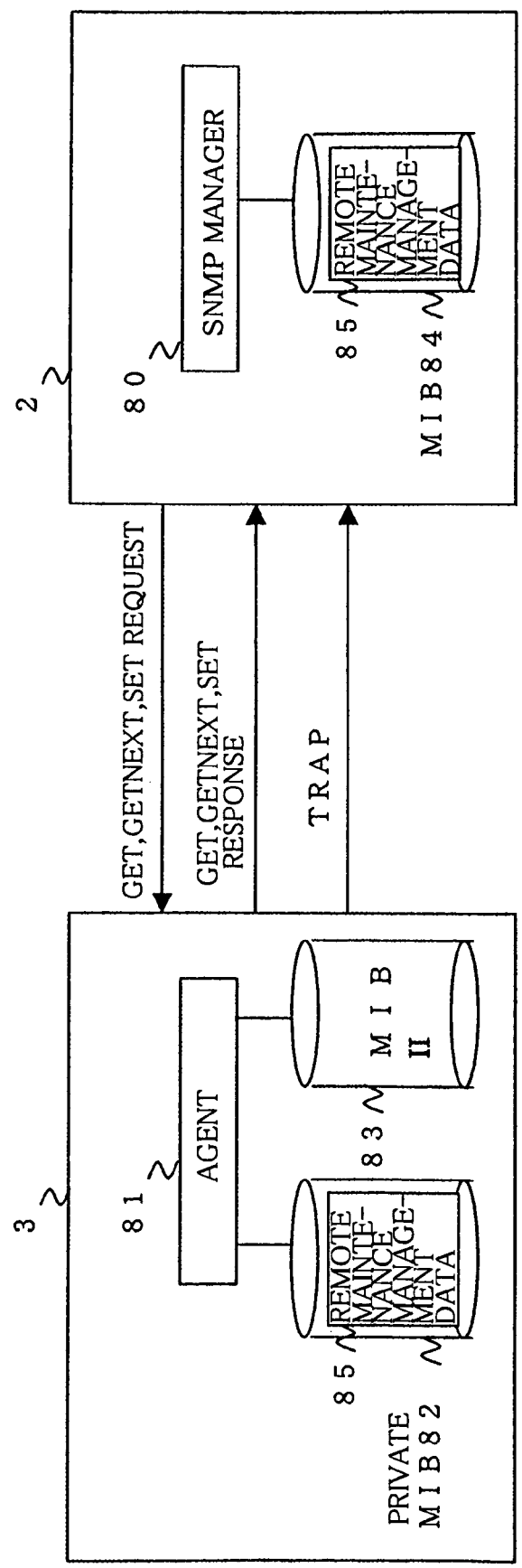

FIG. 4 proVlRemoteMainteTable
proVlRemoteMainteEntry

| | | |
|---|---|---|
| ① INDEX NUMBER | proVlRemoteMainteIdx | Integer32 |
| ② KIND OF FUNCTION | proVlRemoteMainteFunction | Integer32 |
| ③ KIND OF PROTOCOL | proVlRemoteMainteProntoType | Integer32 |
| ④ VERSION OF PROTOCOL | proVlRemoteMainteProntoVer | Integer32 |
| ⑤ PATH OF ACCESS DESTINATION | proVlRemoteMaintePath | DisplayString |
| ⑥ SERVICE LEVEL | proVlRemoteMainteSvcLevel | Integer32 |

| VALUE | KIND | FUNCTION, WORK CONTENT | FUNCTION, WORK CONTENT (ENGLISH) | PROTOCOL |
|---|---|---|---|---|
| 01 | MONITORING | MONITORING MIB-2 ITEM | SNMP MIB-2 AGENT | SNMP |
| 02 | MONITORING | MONITORING OF PRIVATE MIB | SNMP PRIVATE MIB AGENT | SNMP |
| 11 | MAINTENANCE | NOTIFICATION OF ERROR/WARNING BY EMAIL | E-MAIL NOTIFICATION | SMTP AND POP3 |
| 12 | MAINTENANCE | OPERATION BY COMMAND MAIL | E-MAIL OPERATION | SMTP AND POP3 |
| 21 | MAINTENANCE | REFERENCE OF STATUS | STATUS REFERRING | HTTP OR TELNET |
| 31 | MAINTENANCE | LOG COLLECTION | LOG TRANSFER | FTP (HTTP,TELNET) |
| 41 | MAINTENANCE | REFERRING AND CHANGING OF SET VALUE AND COMPOSITION INFORMATION | SETTING CHECK AND CHANGE | HTTP OR TELNET |
| 42 | MAINTENANCE | DOWNLOAD OF SET VALUE | DATA DOWNLOAD | FTP |
| 43 | MAINTENANCE | UPLOAD OF SET VALUE | DATA UPLOAD | FTP |
| 51 | MAINTENANCE | DIAGNOSIS EXECUTION | DIAGNOSIS EXECUTION | HTTP OR TELNET |
| 61 | MAINTENANCE | DOWNLOAD OF SOFTWARE | SOFTWARE DOWNLOAD | FTP |
| 62 | MAINTENANCE | UPLOAD OF SOFTWARE | SOFTWARE UPLOAD | FTP |
| 71 | MAINTENANCE | RESET, REBOOT | RESET/REBOOT | THHP OR TELNET |
| 72 | MAINTENANCE | MODE CHANGE | MODE CHANGE | THHP OR TELNET |
| 81 | MAINTENANCE | CONTROL OF DEVICE | CONTROL | THHP OR TELNET |

KIND OF FUNCTION AND PROTOCOL

FIG. 6

| LEVEL NO. | NAME | RANGE OF PERMITTING TO USE, DISCLOSING |
|---|---|---|
| (0) | (FACTORY LEVEL) | (USED BY LIMITING TO PRODUCTION DEPARTMENT IN VENDOR) |
| 1 | SERVICE LEVEL | UP TO SERVICE FOOTHOLDS (SALES) IN VENDOR |
| 2 | LEVEL | UP TO SERVICE FOOTHOLDS (AGENT) |
| 3 | USER ADMINISTRATION LEVEL | UP TO MANAGER ON CUSTOMER SIDE |
| 4 | USER LEVEL | GENERAL USER |

SERVICE LEVEL

FIG. 7

| INDEX NO. | KIND OF FUNCTION | KIND OF PROTOCOL | VERSION OF PROTOCOL | PATH OF ACCESS DESTINATION | SERVICE LEVEL |
|---|---|---|---|---|---|
| 1 | 01(MONITORING MIB-2 ITEMS) | 161(SNMP) | 100 | | 3(USER ADMINISTRATION LEVEL) |
| 2 | 02(MONITORING PRIVATE MIB ITEMS) | 161(SNMP) | 100 | | 3(USER ADMINISTRATION LEVEL) |
| 3 | 21(REFERRING TO STATUS) | 80(HTTP) | 110 | /service/status | 1(SERVICE LEVEL) |
| 4 | 31(LOG COLLECTION) | 20(FTP) | NONE | /var/log | 1(SERVICE LEVEL) |
| 5 | 41(REFERRING AND CHANGING OF SET VALUE AND COMPOSITION INFORMATION) | 80(HTTP) | 110 | /setup | 3(USER ADMINISTRATION LEVEL) |
| 6 | 51(DIAGNOSIS EXECUTION) | 80(HTTP) | 110 | /service/diag | 1(SERVICE LEVEL) |
| 7 | 61(DOWNLOAD OF SOFTWARE) | 20(FTP) | NONE | temp/firmware | 1(SERVICE LEVEL) |

ONE EXAMPLE OF REMOTE MAINTENANCE MANAGEMENT DATA 85

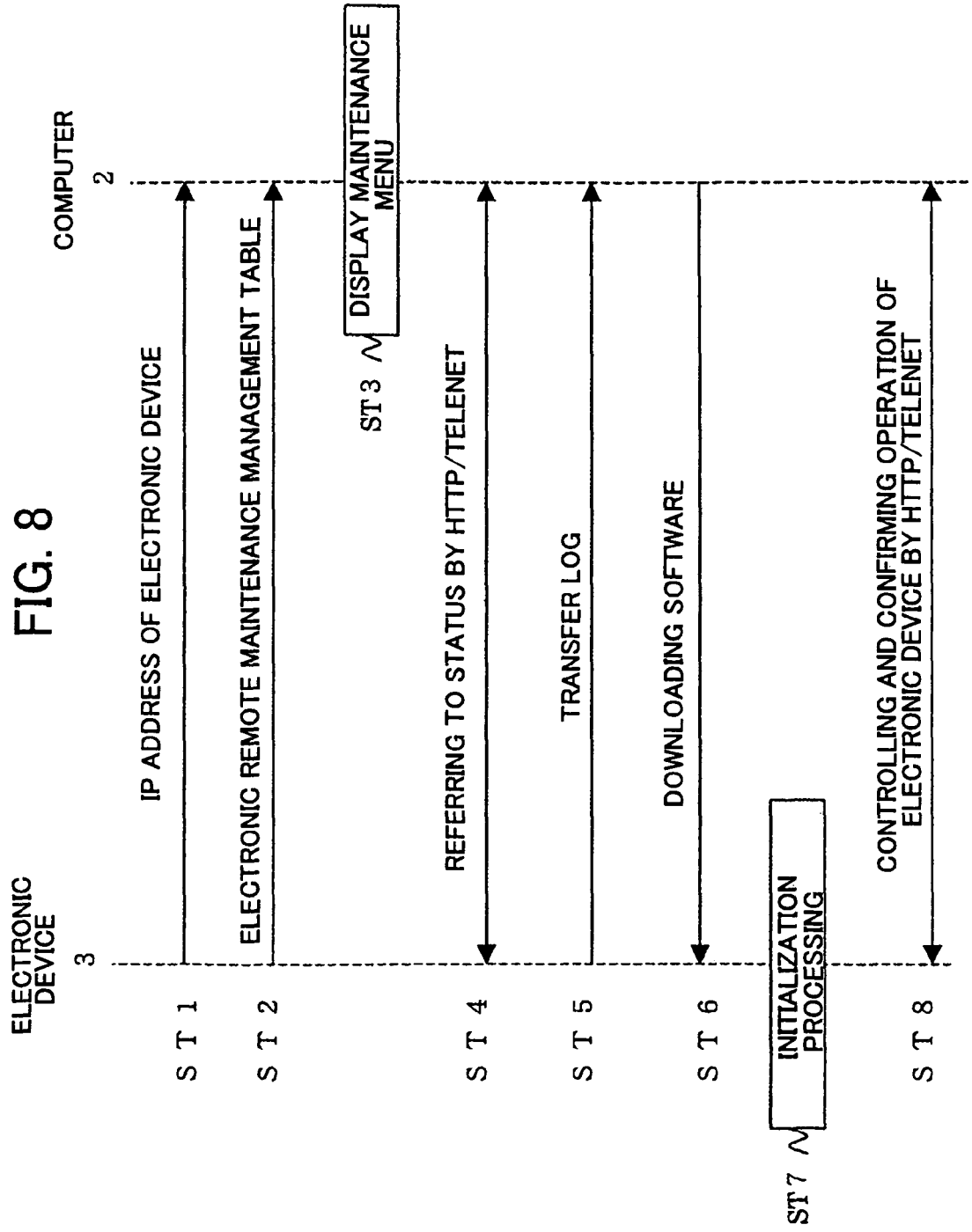

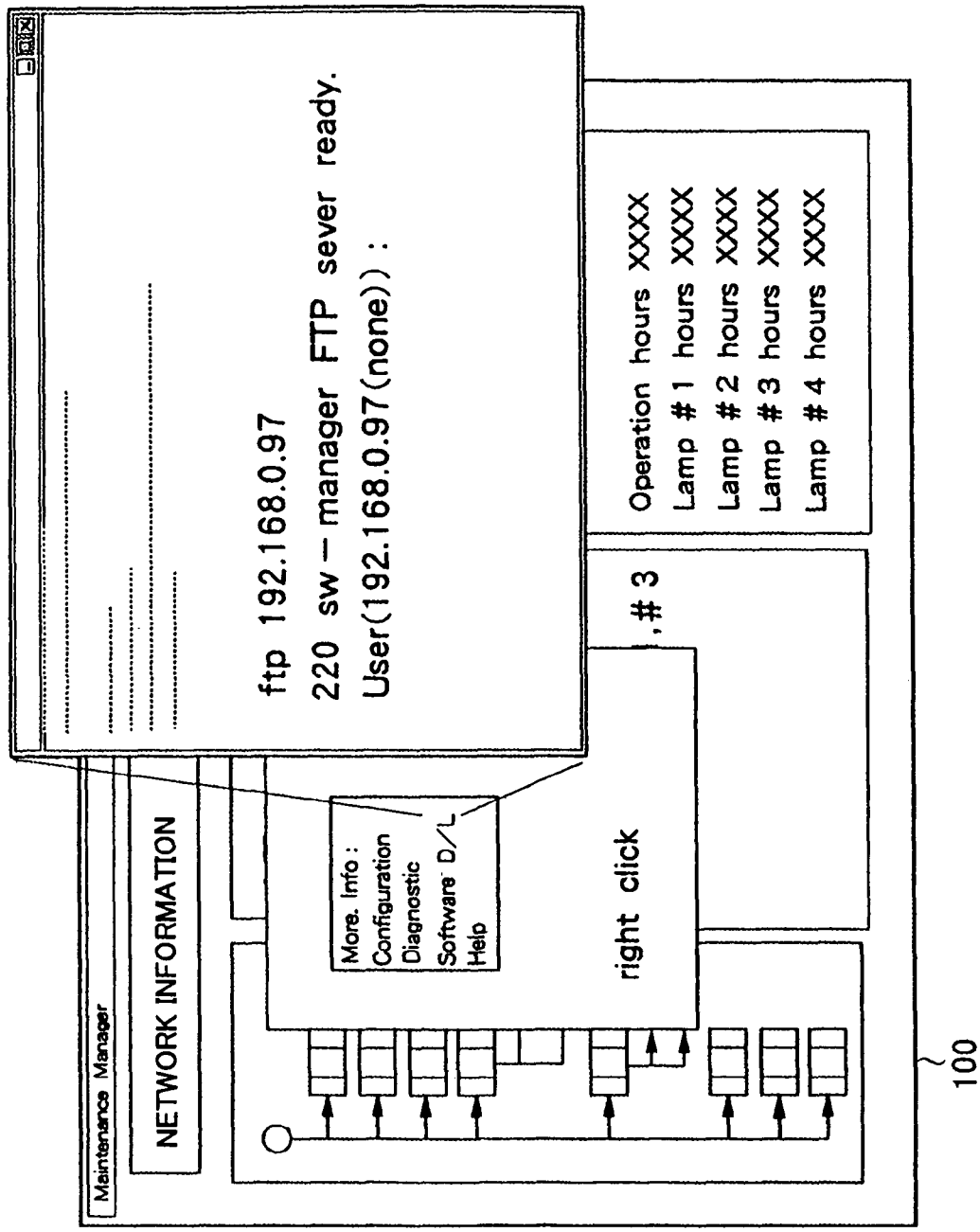

```
proV1TrapDestTable
  proV1TrapDestEntry
  ① INDEX NO.              proV1TrapDestIdx      Integer32
  ② Trap TRANSMISSION      proV1TrapDestAddress  IpAddress  (Read-Write)
     DESTINATION ADDRESS
  ③ STATUS OF ENTRY        proV1TrapDestEntryStatus  Integer32 (Read-Write)
```

| VALUE | MEANINGS |
|---|---|
| 1 (VALID) | VALID |
| 2 (CREATE REQUEST) | REQUEST TO ADD LINE ENTRY (FROM MANAGER TO AGENT) |
| 3 (UNDER CREATION) | INDICATING ENDING OF LINE ENTRY GENERATING OPERATION (FROM AGENT TO MANAGER) |
| 4 (INVALID) | INVALID (NOT GENERATED IN THIS STATE) |
| 5 (FIXED) | INDICATING THAT IP ADDRESS IS SET BEING FIXED |

| | STATUS BEFORE PROCESSING | PROCESSING CONTENTS | STATUS OF EntryStatus AFTER PROCESSING |
|---|---|---|---|
| FIG. 19A | LINE ALREADY EXISTS ON INDEX=n ENTRY STATUS=1(VALID) | RECEIVING "SetRequest" (proV1TrapDestEntryStatus.n,1). BECAUSE IT IS ORIGINALLY "1", RETURNING "GetResponse" OF NORMAL PROCESSING TO MANAGER WITHOUT CHANGING. | EntryStatus IS LEFT "1" (VALID) |
| FIG. 19B | LINE ALREADY EXISTS ON INDEX=n ENTRY STATUS=3 (underCreation) | RECEIVING "SetRequest" (proV1TrapDestEntryStatus.n,1) AND VALIDATING LINE. RETURNING "GetResponse" OF NORMAL PROCESSING TO MANAGER. | CHANGING EntryStatus FROM "3" (underCreation) TO "1" (VALID) |
| FIG. 19C | LINE ALREADY EXISTS ON INDEX=n WHEN ENTRY STATUS=4, 5 | EVEN WHEN RECEIVING "SetRequest" (proV1TrapDestEntryStatus.n,1), CHANGING IS IMPOSSIBLE, SO RETURNING "GetResponse" OF badvalue ERROR TO MANAGER. | EntryStatus IS NOT CHANGED |
| FIG. 19D | LINE DOES NOT EXISTS ON INDEX=n | RECEIVING "SetRequest" (proV1TrapDestEntryStatus.n,2) AND ADDING NEW LINE OF 0.0.0.0. RETURNING "GetResponse" OF NORMAL PROCESSING TO MANAGER. | EntryStatus IS SET TO "3" (underCreation) |
| FIG. 19E | LINE ALREADY EXISTS ON INDEX=n | EVEN WHEN RECEIVING "SetRequest" (proV1TrapDestEntryStatus.n,2), BECAUSE LINE ALREADY EXISTS, SO RETURNING "GetResponse" OF badvalue ERROR TO MANAGER. | VALUES IN TABLE ARE NOT CHANGED |
| FIG. 19F | ALL CASES | "SetRequest" (proV1TrapDestEntryStatus.n,1), "SetRequest" (proV1TrapDestEntryStatus.n,1) AND "SetRequest"(proV1TrapDestEntryStatus.n,1) ARE NOT TRANSMITTED FROM MANAGER. WHEN RECEIVED, RETURNING "GetResponse" OF badvalue ERROR TO MANAGER. | VALUES IN TABLE ARE NOT CHANGED |

FIG. 20

| INDEX | ADDRESS | ENTRY STATUS |
|---|---|---|
| FIRST LINE | 0.0.0.0 | 5(FIXED) |

FIG. 21

| INDEX | ADDRESS | ENTRY STATUS |
|---|---|---|
| FIRST LINE | XX.XX.XX.XX | 5(FIXED) |
| SECOND LINE | YY.YY.YY.YY | 5(FIXED) |

FIG. 22A
| INDEX | ADDRESS | ENTRY STATUS |
|---|---|---|
| FIRST LINE | XX.XX.XX.XX | 5(FIXED) |
| SECOND LINE | YY.YY.YY.YY | 5(FIXED) |
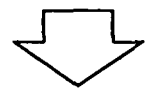
FIG. 22B
| INDEX | ADDRESS | ENTRY STATUS |
|---|---|---|
| FIRST LINE | XX.XX.XX.XX | 1(VALID) |
| SECOND LINE | YY.YY.YY.YY | 1(VALID) |
FIG. 23A
| INDEX | ADDRESS | ENTRY STATUS |
|---|---|---|
| FIRST LINE | XX.XX.XX.XX | 1(VALID) |
| SECOND LINE | YY.YY.YY.YY | 1(VALID) |
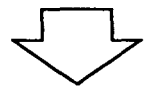
FIG. 23B
| INDEX | ADDRESS | ENTRY STATUS |
|---|---|---|
| FIRST LINE | XX.XX.XX.XX | 5(FIXED) |
| SECOND LINE | YY.YY.YY.YY | 5(FIXED) |

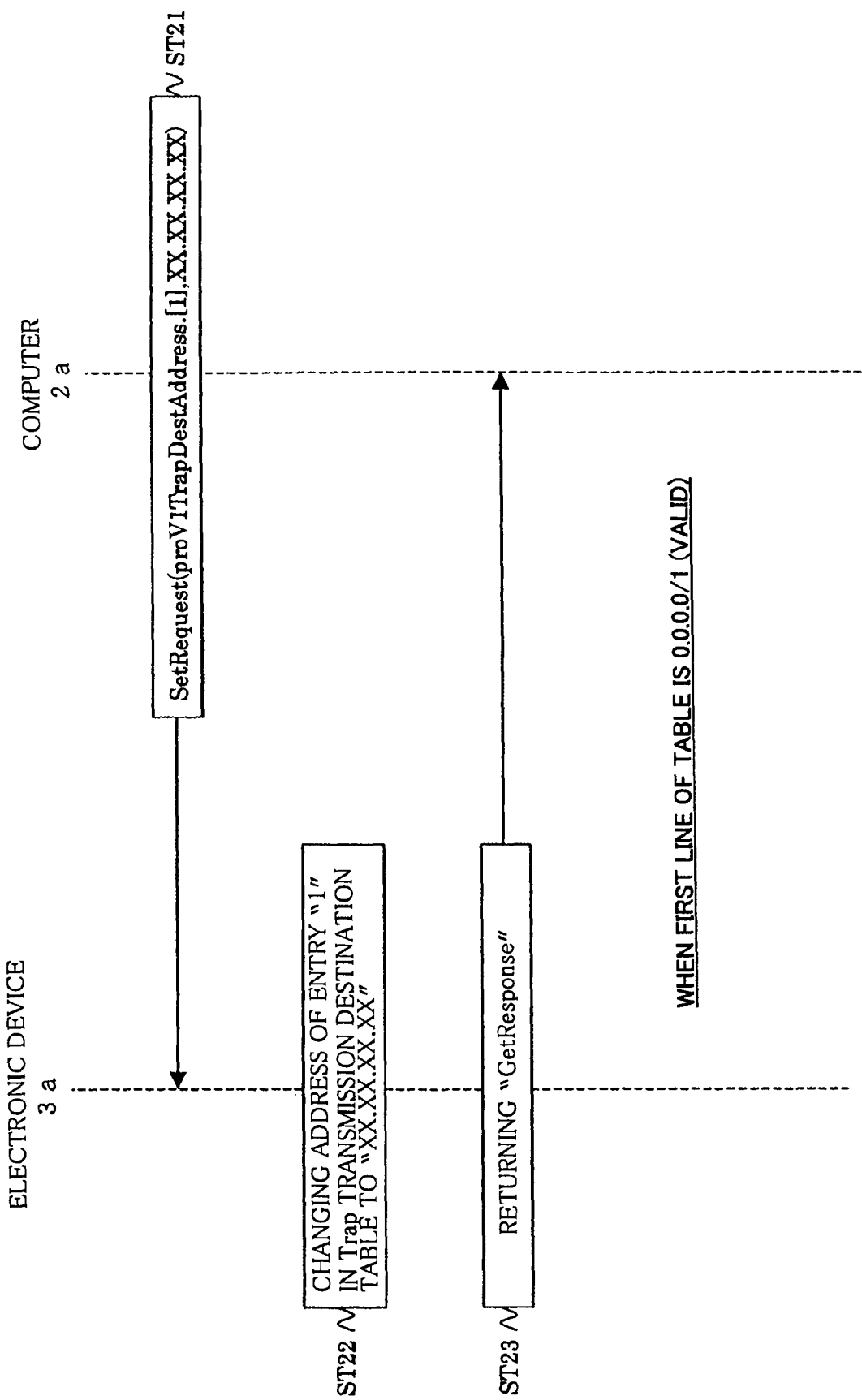

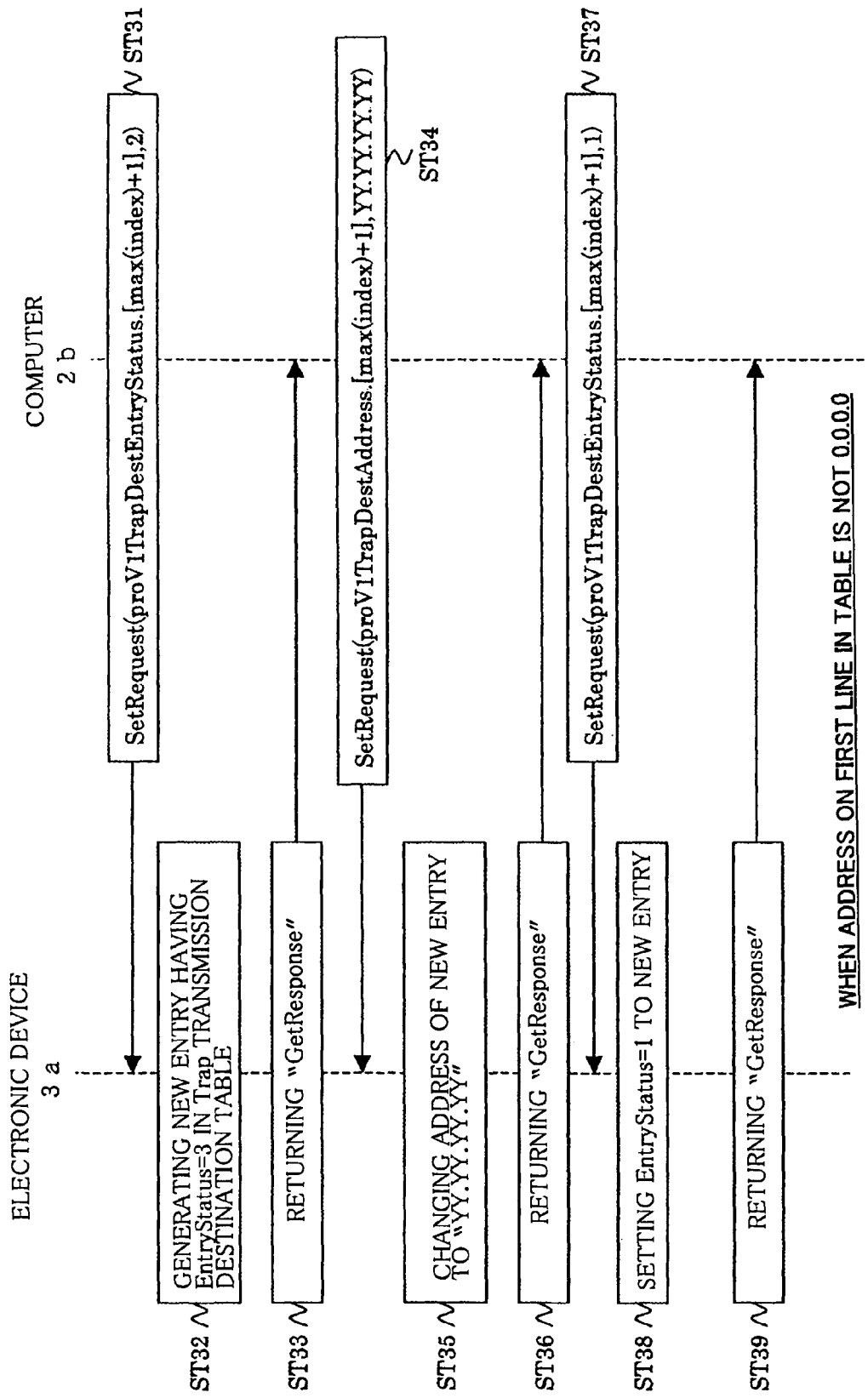

FIG. 26A
| INDEX | ADDRESS | ENTRY STATUS |
|---|---|---|
| FIRST LINE | XX.XX.XX.XX | 1(VALID) |
| SECOND LINE | 0.0.0.0 | 3(UNDER CREATION) |
FIG. 26B
| INDEX | ADDRESS | ENTRY STATUS |
|---|---|---|
| FIRST LINE | XX.XX.XX.XX | 1(VALID) |
| SECOND LINE | YY.YY.YY.YY | 3(UNDER CREATION) |
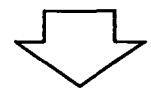
FIG. 26C
| INDEX | ADDRESS | ENTRY STATUS |
|---|---|---|
| FIRST LINE | XX.XX.XX.XX | 1(VALID) |
| SECOND LINE | YY.YY.YY.YY | 1(VALID) |

ELECTRONIC DEVICE MONITORING METHOD, ELECTRONIC DEVICE COMPUTER AND PROGRAM THEREOF

This is a divisional of application Ser. No. 10/451,968, filed Jun. 27, 2003 now abandoned under 35 USC 371 from International Application PCT/JP02/11276, filed Oct. 30, 2002 with a claim of priority under 35 USC 119 to Japanese Application 2001-333318, filed in Japan on Oct. 30, 2001, the entirety thereof being incorporated herein by reference.

TECHNICAL FIELD

The present invention relates to an electronic device monitoring method, an electronic device, a computer and the program for performing processing for monitoring and maintenance of an electronic device connected via a network, such as a domestic LAN and the Internet, etc.

BACKGROUND ART

In a TCP/IP network system, a condition of an electronic devices, such as a rooter and a computer, connected to a network is monitored and controlled via the network, for example, by using the SNMP (Simple Network Management Protocol).

In some of the TCP/IP network systems, a computer operates monitoring and maintenance of an electronic device, etc. via a network by using the HTTP (HyperText Transfer Protocol), the FTP (File Transfer Protocol) and the Telenet, etc. being high in security comparing with the SNMP.

Conventionally, after a computer obtains data of an electronic device in an operating state by using the SNMP protocol, a user separately starts up a Web browser and obtains information, such as an IP address of the electronic device, a communication protocol for communicating with the electronic devices, an access path (URL: Uniform Resource Locator) in a memory region of the electronic device, etc. to communicate with other electronic devices and to perform communication and processing relating to maintenance of the electronic device.

The communication protocol used by the electronic device for its maintenance differs in some cases depending on respective electronic devices.

In that case, if an administrator of the computer as a monitoring device sets to the computer communication protocols used for notifications between respective electronic devices, the load on the administrator becomes heavy, which is disadvantageous.

Also, as explained above, conventionally, a process of obtaining an operating condition of an electronic device 3 by using the SNMP protocol and a process of maintenance of the electronic device 3 by using the Web browser have to be performed separately. Thus, there is a problem that monitoring and maintenance cannot be performed integrally and a load on the user is large.

In the SNMP communication, when abnormality or an event arises in the electronic device, the electronic device generates a Trap to notify the state to the computer.

For that purpose, it is necessary that an IP address of the computer to which the Trap is transmitted is set to the electronic device.

Conventionally, the user sets the IP address as the transmission destination of the Trap by means of inputting to the electronic device.

As explained above, however, there is a problem that it is time consuming and inconvenient for the user to input to the electronic device the IP address as a transmission destination of the Trap.

Also, when the electronic device is portable and connected to a plurality of computers, the user has to input to the electronic device the IP address as a transmission destination of the Trap each time, which is particularly inconvenient.

When the Ipv6 will be widely used in the future, it is anticipated that household electronic appliances and portable terminal devices utilizing the IP protocol will increase, but it is reluctant to do the time consuming setting works when using the SNMP in the electronic devices.

DISCLOSURE OF INVENTION

The present invention was made in consideration on the above problems and has as an object thereof to provide an electronic device monitoring method, an electronic device, a computer and its program capable of automatically setting to a computer a communication protocol used between the computer and an electronic device to be monitored when performing maintenance of the electronic device.

Also, an object of the present invention is to provide an electronic device monitoring method, an electronic device, a computer and its program capable of integrally performing monitoring and maintenance of the above electronic device.

Also, an object of the present invention is to provide an electronic device monitoring method, an electronic device, a computer and its program capable of saving a trouble of the user at the time of setting to the electronic device an IP address as a transmission destination of a Trap.

To attain the above objects, an electronic device maintenance method of the first invention is an electronic device maintenance method for performing maintenance of an electronic device by a computer via a network, comprising a first step that the computer obtains remote maintenance management data indicating a communication protocol used in a communication relating to maintenance of the electronic device from the electronic device via the network; and a second step that the computer performs processing relating to maintenance of the electronic device by performing a communication with the electronic device by using the communication protocol indicated by the remote maintenance management data obtained in the first step.

Preferably, an electronic device maintenance method of the first invention further includes a third step that, when connection by the electronic device to the network is recognized, the computer obtains identification data of the recognized electronic device on the network; and in the second step, the computer performs the communication with the electronic device by further using the identification data obtained in the third step.

Preferably, in an electronic device maintenance method of the first invention, in the first step, the computer obtains from the electronic device the remote maintenance management data indicating correspondence between a kind of one or a plurality of functions relating to the maintenance and the communication protocol used in communication relating to the function; and in the second step, the computer performs communication relating to the specified kind of function by using the communication protocol corresponding to the specified kind of function with the electronic device based on the remote maintenance management data.

Preferably, an electronic device maintenance method of the first invention further includes a sixth step that the computer automatically writes to the electronic device identification data for identifying the computer on a network as transmission destination data; and a seventh step that the electronic device transmits an interruption signal to the computer by using the transmission destination data written in the sixth step when the electronic device becomes a predetermined condition.

A computer of the second invention is a computer for performing maintenance of an electronic device via a network, comprising an interface for performing a communication with the electronic device via the network; a memory means for storing remote maintenance management data indicating a communication protocol used in a communication relating to maintenance of the electronic device obtained from the electronic device via the interface; and a control means for performing processing relating to maintenance of the electronic device by performing a communication with the electronic device via the interface by using the communication protocol indicated by the remote maintenance management data stored in the memory means.

An electronic device of the third invention is an electronic device subjected to maintenance by a computer via a network, comprising an interface for performing a communication with the computer via the network; a memory means for storing remote maintenance management data indicating a communication protocol used in a communication relating to maintenance by the computer; and a control means for transmitting the remote maintenance management data to the computer via the interface and performs a communication relating to the maintenance with the computer by using the communication protocol indicated by the remote maintenance management data in accordance with a request from the computer.

A program of the fourth program is a program executed by a computer for performing maintenance of an electronic device via a network, comprising a first step for receiving remote maintenance management data indicating a communication protocol used in a communication relating to maintenance of the electronic device from the electronic device via the network; a second step for storing the remote maintenance management data received in the first step in a memory means provided to the computer; and a third step for processing relating to maintenance of the electronic device by performing a communication with the electronic device via the network by using the communication protocol indicated by the remote maintenance management data stored in the memory means.

A program of the fifth invention is a program executed in an electronic device subjected to maintenance by a computer via a network, comprising a first step for transmitting to the computer via the network remote maintenance management data indicating a communication protocol used in a communication relating to maintenance of the electronic device with the computer; and a second step for performing communication relating to the maintenance with the computer by using the communication protocol indicated by the remote maintenance management data.

BRIEF DESCRIPTION OF DRAWINGS

FIG. 3 is a view for explaining SNMP communication processing.

FIG. 4 is a view for explaining remote maintenance management data stored in a private MIB shown in FIG. 3.

FIG. 5 is a view for explaining kinds of functions in the remote maintenance management data shown in FIG. 4.

FIG. 6 is a view for explaining service levels in the remote maintenance management data shown in FIG. 4.

FIG. 7 is a view for explaining an example of the remote maintenance management data shown in FIG. 4.

FIG. 8 is a flowchart for explaining an operation example of the communication system shown in FIG. 1.

FIG. 9 is a view for explaining a process that a user of a computer selects a maintenance function on a screen in FIG. 8.

FIG. 17 is a view for explaining meanings of values of statuses of the Trap transmission destination table shown in FIG. 16.

FIGS. 19A to 19F are views for explaining processing conditions of the electronic device in response to requests by the computer.

FIG. 20 is a view for explaining the case where an automatic setting variable shown in FIG. 15 is off.

FIG. 21 is a view for explaining the case of setting the Trap transmission destination table on the electronic device side.

FIGS. 22A and 22B are views for explaining the case where the automatic setting variable shown in FIG. 15 shifts from off to on.

FIGS. 23A and 23B are views for explaining the case where the automatic setting variable shown in FIG. 15 shifts from on to off.

FIG. 24 is a flowchart for explaining an operation example of the communication system shown in FIG. 12 when an SNMP manager sets to the electronic device an IP address of the computer as a Trap transmission address in a state wherein a Trap transmission address of an entry on the first line in the Trap transmission destination table is "0. 0. 0. 0" and a status thereof is "valid".

FIG. 25 is a flowchart for explaining an operation example of the communication system shown in FIG. 12 at the time an SNMP manager of another computer sets to the electronic device the IP address of the computer as a Trap transmission address in the state wherein a Trap transmission address of an entry on the first line of the Trap transmission destination table is not "0. 0. 0. 0" (a state wherein an IP address of the computer is already set).

FIGS. 26A, 26B and 26C are views for explaining conditions of the Trap transmission destination table in the operation example shown in FIG. 25.

BEST MODE FOR CARRYING OUT THE INVENTION

Below, a communication system according to embodiments of the present invention will be explained.

First Embodiment

Figure 1:
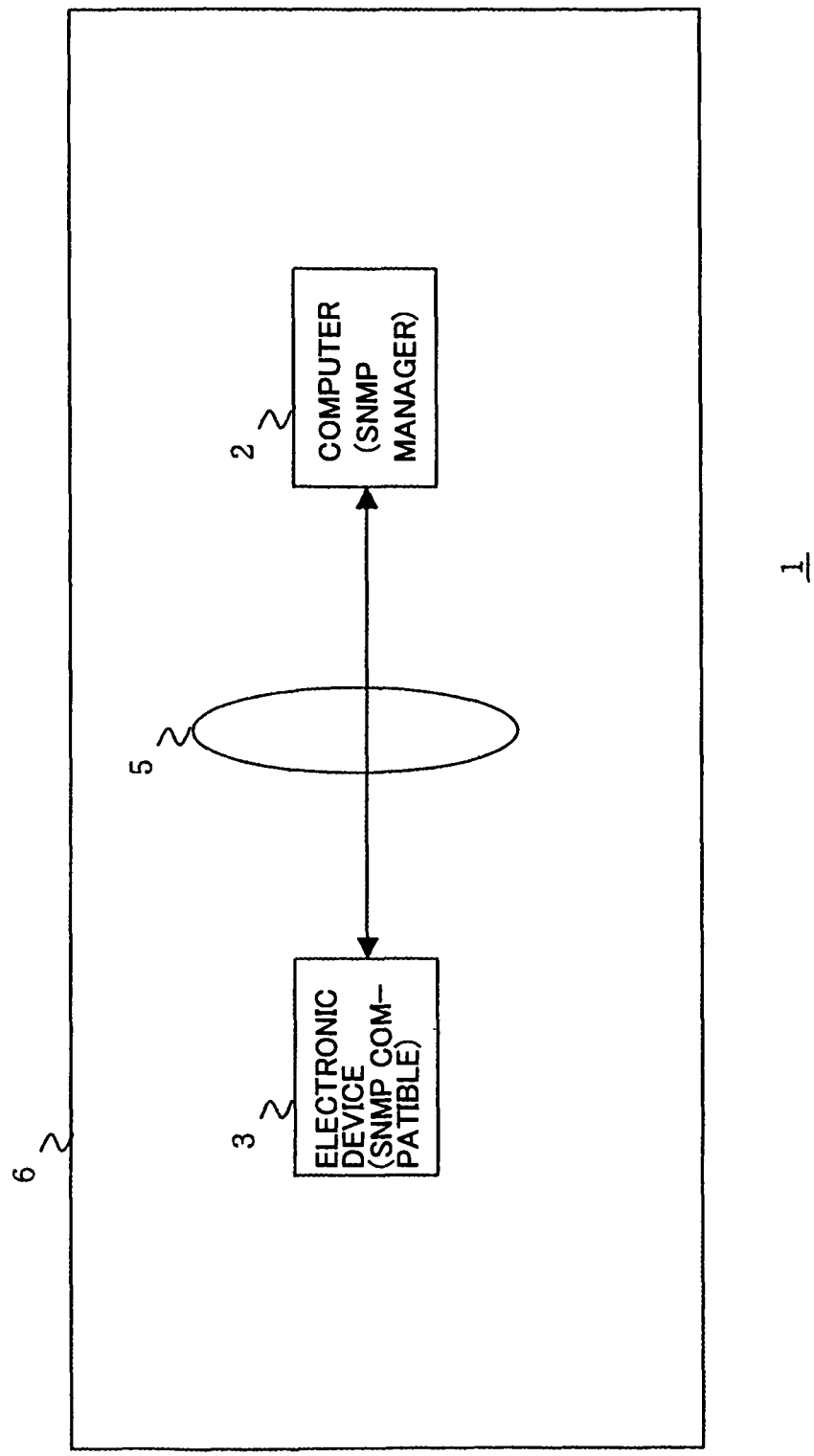
FIG. 1 is a view of the overall configuration of a communication system according to a first embodiment of the present invention.

FIG. 1 is a view of the overall configuration of a communication system 1 according to the present embodiment.

As shown in FIG. 1, in the communication system 1, for example, a computer 2 as a device to be monitored and an electronic device 3 as a device to be monitored are connected in a predetermined area 6 via a network, such as a LAN (Local Area Network) 5 and the Internet.

Here, the computer 2 corresponds to a computer of the present invention and the electronic device 3 corresponds to an electronic device of the present invention.

The computer 2 and the electronic device 3 have a function of performing processing relating to the SNMP as a connectionless type network management protocol operating on a UDP transport layer of the TCP/IP.

In the communication system 1 shown in FIG. 1, the computer 2 and the electronic device 3 perform an SNMP communication, define a communication protocol, etc. used for realizing a remote maintenance (monitoring) function in respective MIBs of the computer 2 and the electronic device 3, and perform remote maintenance by using the definition.

Note that in the present specification, the maintenance also includes monitoring.

As a result, a load at the time the user performs remote maintenance of the electronic device 3 by using the computer 2 is reduced.

[Computer 2]

Figure 2:
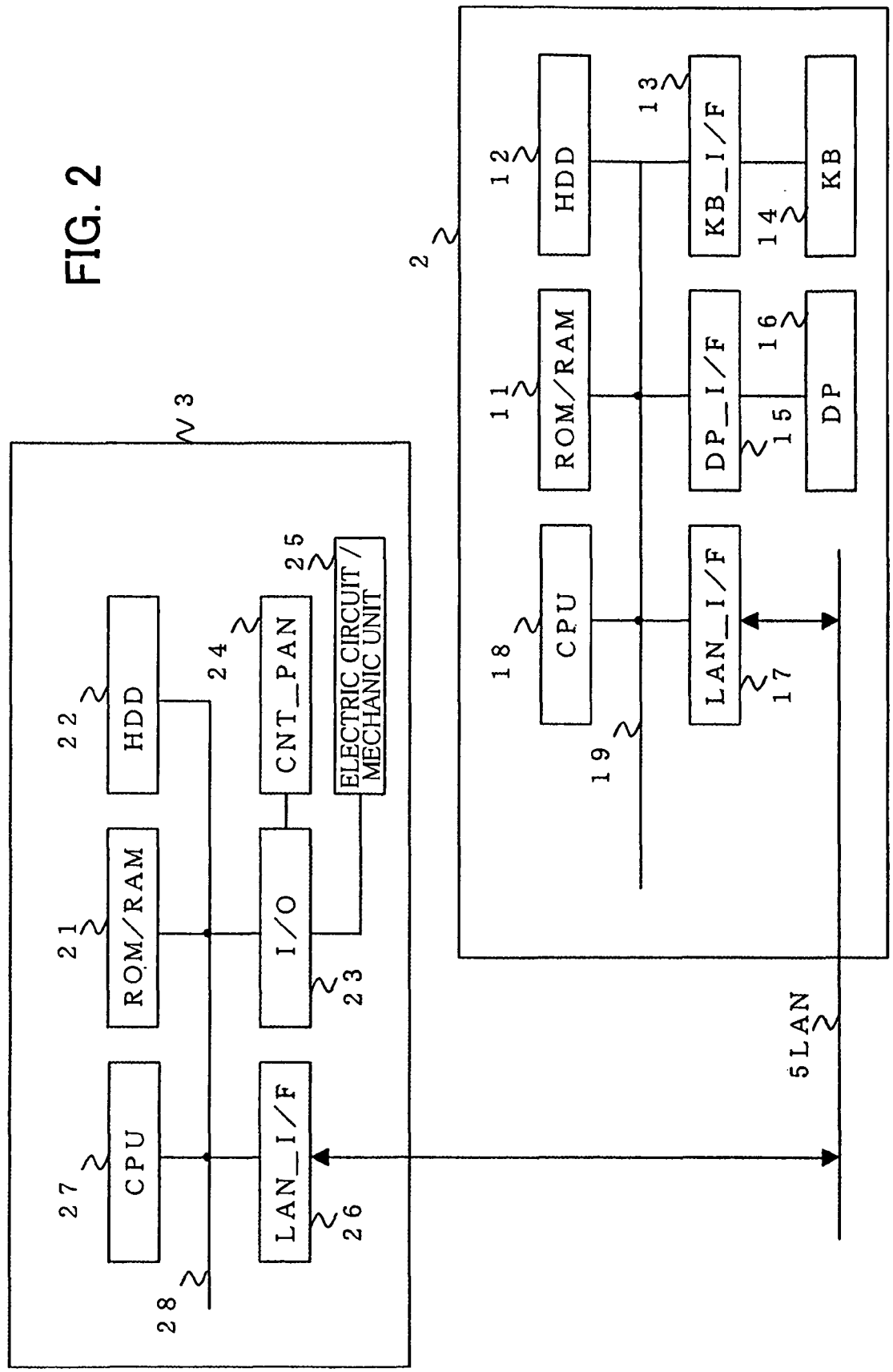
FIG. 2 is a view of the configuration of a computer and a device to be monitored shown in FIG. 1.

FIG. 2 us a view of the configuration of the computer 2 and the electronic device 3 shown in FIG. 1.

As shown in FIG. 2, in the computer 2, for example, a ROM/RAM 11, an HDD 12, a KB_1/F 13, a DP_IF 15, a LAN_I/F 17 and a CPU 18 are connected via an internal bus 19.

Here, the LAN_I/F 17 corresponds to an interface means of the computer of the present invention, the ROM/RAM 11 and the HDD 12 correspond to a memory means of the computer of the present invention, and the CPU 18 corresponds to a control means of the computer of the present invention.

The ROM/RAM 11 stores a program for realizing a variety of functions provided by the computer 2 including an SNMP processing function.

The HDD 12 stores various data used in processing in the computer 2.

Also, as will be explained later on, a remote maintenance management table received (inputted) from the electronic device 3 via the LAN 5 is written in the ROM/RAM 11 or/and the HDD 12.

The KB_I/F 13 is connected to an operation means (a specifying means of the present invention), such as a keyboard KB 14 and a mouse.

The DP_IF 15 is connected to a display DP 16 (a display means of the present invention), etc.

The LAN_I/F 17 is connected to the LAN 5.

The CPU 18 realizes a variety of functions, such as an SNMP processing function and a remote maintenance function, for example, based on a program read from the ROM/RAM 11.

[Electronic Device 3]

As shown in FIG. 2, in the electronic device 3, for example, a ROM/RAM 21, an HDD 22, an I/O 23, a LAN_I/F 26 and a CPU 27 are connected via an internal bus 28.

Here, the LAN_I/F 26 corresponds to an interface means of the electronic device of the present invention, the CPU 27 corresponds to a control means of the electronic device of the present invention, and the ROM/RAM 21 and the HDD 22 correspond to a memory means of the electronic device of the present invention.

In the present embodiment, the electronic device 3 is for example a television device, an audio device, lighting and other electronic devices.

The ROM/RAM 21 stores a program for realizing a variety of functions provided by the electronic device 3 including an SNMP processing function.

The HDD 22 stores various data used by processing in the electronic device 3.

Also, the ROM/RAM 21 and/or the HDD 22 store a remote maintenance management table used in remote maintenance by the computer 2.

The remote maintenance management table will be explained in detail later on.

The I/O 23 is connected to a control panel 24 and an electric circuit/mechanic unit 25, etc.

The LAN_I/F 26 is connected to the LAN 5.

The CPU 27 realizes a variety of functions, such as an SNMP processing function, for example, based on a program read from the ROM/RAM 21.

[SNMP Communication Processing]

Next, SNMP communication processing performed between the computer 2 and the electronic device 3 shown in FIG. 1 will be explained.

FIG. 3 is a view for explaining the SNMP communication processing.

FIG. 3 is a view for explaining the SNMP communication processing performed between the computer 2 and the electronic device 3.

The CPU 18 of the computer 2 executes a program (a program of the fourth invention) read from the ROM/RAM 11 or the HDD 12 and realizes an SNMP manager 80.

Also, the CPU 27 of the electronic device 3 executes a program (a program of the fifth invention) read from the ROM/RAM 21 or the HDD 22 and realizes an SNMP agent 81.

Also, the ROM/RAM 21 or the HDD 22 of the electronic device 3 stores, for example, data of a private MIB (Management Information Base) 82 and a MIB II 83.

The private MIB 82 is an MIB peculiar to a vender originally defined for the vender of the electronic device 3 for managing products of the own company.

In the present embodiment, the remote maintenance management data 85 explained above is stored in the private MIB 82.

The MIB II 83 is an MIB wherein management information of a TCP/IP level is defined.

The SNMP agent 81 obtains information to be managed and notifies the information to the SNMP manager 80 by using a network management protocol of the SNMP. Information needing to be managed is stored in the private MIB 82 and/or MIB II 83 of the electronic device 3.

Also, in the present embodiment, as shown in FIG. 3, also the MIB 84 of the computer 2 stores the remote maintenance management data 85.

Data of the MIB 84 is stored in the ROM/RAM 11 and/or the HDD 12 of the computer 2 shown in FIG. 2.

The SNMP agent 81 transmits information in the private MIB 82 and/or the MIB II 83 to the SNMP manager 80 based on a request from the SNMP manager 80. Note that when an irregular event occurs, such that the electronic device 3 reboots, the SNMP agent 81 transmits a Trap to the SNMP manager 80.

A request of obtaining or setting a value of an object to be managed is given from the SNMP manager 80 to the SNMP agent 81 and the SNMP agent 81 responds to the request. Also, the SNMP agent 81 notifies the irregularity or an event arisen in the electronic device 3 to the SNMP manager 80. To realize the functions, five operations below are regulated in the SNMP.

GET REQUEST: reading data stored in an MIB variable specified from the private MIB 82 and/or the MIB II 83

GETNEXT REQUEST: reading next data of a specified MIB variable by following a procedure of the private MIB 82 and/or the MIB II 83

SET REQUEST: setting an MIB variable to specified data

GET RESPONSE: a response from the SNMP agent 81 to a request

Trap: notifying arising of abnormality and an event from the SNMP agent 81 to the SNMP manager 80

The private MIB 82 and the MIB II 83 store definition of an object (an amount or a field) provided by the SNMP agent 81 to the SNMP manager 80. The object defined by the private MIB 82 and the MIB II 83 is arranged in unit of a group and relates to respective layers or a protocol in a protocol stack of a certain group, while other group as a whole relates to a system.

The private MIB 82 and the MIB II 83 is added an object identifier to uniquely identify any management object and the object identifier has a tree structure starting from a root element.

In the present embodiment, when the electronic device 3 is connected to the LAN 5 shown in FIG. 1, the SNMP manager 80 of the computer 2 shown in FIG. 3 automatically recognizes (discovery) the electronic device 3 and automatically registers an IP address and a host name of the electronic device 3, for example, to the MIB 84 by the "Plug and Play".

[Remote Maintenance Management Data 85]

Below, the remote maintenance management data 85 stored in the private MIB 82 of the electronic device 3 and the MIB 84 in the computer 2 explained above will be explained in detail. FIG. 4 is a view of the configuration of the remote maintenance management data 85.

As shown in FIG. 4, the remote maintenance management data 85 has one or a plurality of entries each comprising an Index number "proV1RemoteMainteIdx" which is data indicating an index number for specifying an entry, "proV1RemoteMainteFunction" (maintenance function specification data of the present invention) which is data indicating a kind of a function of remote maintenance, "proV1RemoteMainteProtoType" (communication protocol specification data of the present invention) which is data indicating a kind of a communication protocol used in a communication between the computer 2 and the electronic device 3 at the time of performing remote maintenance by using the function, "proV1RemoteMainteProtoVer" which is data indicating a version of the communication protocol, "proV1RemoteMaintePath" (path specification data" which is data indicating an access path to a memory region of the ROM/RAM 21 or the HDD 22 storing data or a program relating to the remote maintenance, and "proV1RemoteMainteSvcLevel" (use authority data of the present invention) which is data indicating a service level for specifying persons to be permitted to use or disclosed the function.

The data "proV1RemoteMainteFunction" indicating a kind of a function of the remote maintenance is a 32-bit integer type.

The SNMP manager 80 of the computer 2 refers to the data "proV1RemoteMainteFunction" in accordance with an instruction (specification) inputted for example from the keyboard 14, reads a program of a specified function from the ROM/RAM 11 or the HDD 12 and executes.

The data "proV1RemoteMainteFunction" indicates a kind of a function to which, for example, each of values "01", "11", "12", "21", "31", "41", "42", "43", "51", "61", "62", "71", "72" and "81" corresponds as shown in FIG. 5.

Here, values "01" and "02" indicate a function relating to monitoring. The value "01" indicates a function for monitoring a predetermined item of the MIB II 83 of the electronic device 3 shown in FIG. 3, and the value "02" indicates a function for monitoring a predetermined item of the private MIB 82 of the electronic device 3 shown in FIG. 3.

Also, values "11", "12", "21", "31", "41", "42", "43", "51", "61", "62", "71", "72" and "81" indicate functions relating to the maintenance.

For example, the value "11" indicates a function that the SNMP 81 notifies an error or a warning to the SNMP manager 80 by using an e-mail.

The value "12" indicates a function that the SNMP manager 80 operates the electronic device 3 by using an e-mail.

The value "21" indicates a function that the SNMP manager 80 refers to a status indicating a condition of the electronic device 3 stored in the private MIB 82 and/or the MIB II 83 and/or other database or a file.

The value "31" indicates a function that the SNMP manager 80 collects record data (log) of processing in the electronic device 3 stored in the private MIB 82 and/or the MIB II 83 and/or other data base or a file.

The value "41" indicates a function that the SNMP manager 80 refers to and changes a predetermined set value and composition information of the electronic device 3.

The value "42" indicates a function that the SNMP manager 80 downloads a predetermined set value of the electronic device 3 to the electronic device 3.

The value "43" indicates a function that the SNMP manager 80 uploads a predetermined set value of the electronic device 3.

The value "51" indicates a function that the SNMP manager 80 executes diagnosis processing of the electronic device 3.

The value "61" indicates a function that the SNMP manager 80 downloads for example software used by processing in the SNMP agent 81 to the electronic device 3.

The value "62" indicates a function that the SNMP manager 80 uploads a predetermined software from the electronic device 3.

The value "71" indicates a function that the SNMP manager 80 resets or reboots the electronic device 3.

The value "72" indicates a function that the SNMP manager 80 switches various modes set in the electronic device 3.

Also, the value "81" indicates a function that for example the SNMP manager 80 controls predetermined processing performed in the electronic device 3.

The data "proV1RemoteMainteProtoType" is a number indicating a kind of a communication protocol used in a communication between the computer 2 and the electronic device 3 at the time of performing remote maintenance by using a corresponding function as explained above. A port number is used as the number.

The SNMP manager 80 of the computer 2 refers to the data "proV1RemoteMainteProtoType" corresponding to a specified function in response to an instruction (specification) inputted for example from the keyboard 14, uses a communication protocol specified thereby and performs communication with the electronic device 3.

The data "proV1RemoteMainteProtoType" indicates, for example, a value "80" when the HTTP is used, a value "20" when the FTP is used, a value "23" when the TELENET is used, a value "25" when the SMTP (Simple Mail Transfer Protocol) is used, a value "110" when the POP3 is used and a value "161" when the SNMP is used as a communication protocol.

The data "proV1RemoteMainteProtoVer" indicates a version of a corresponding communication protocol and has a value indicating the version as explained above.

The data "proV1RemoteMaintePath" indicates a path to access first at the time of accessing to the electronic device 3 by using an access path to a memory region of the ROM/RAM 21 or the HDD 22 storing data or a program used in a corresponding function, that is the HTTP (Web Browser) or the FTP (FTP client) as explained above.

For example, when an IP address of the electronic device 3 is "192. 168. 10. 101" and a path in the electronic device 3 to access at the time of executing a setup change function is "/setup", the data "proV1RemoteMaintePath" indicates "/setup".

The SNMP manager 80 of a specific vender operates to access for example to an URL "http://192. 168. 10. 101/setup" by a browser by combining information of the IP address and the path.

The SNMP manager 80 refers to "proV1RemoteMaintePath" corresponding to a specified function in accordance with an instruction (specification) inputted for example from the keyboard 14 and, by following a path specified thereby, makes an access to a memory region of the electronic device 3 during processing relating to the specified function.

The data "proV1RemoteMainteSvcLevel" indicates a number of a service level for specifying persons to whom the corresponding function is permitted to be used or disclosed, that is, a service level of a remote maintenance function as explained above.

The SNMP manager 80 refers to "proV1RemoteMainteSvcLevel" corresponding to a specified function in accordance with an instruction (specification) inputted for example from the keyboard 14 and, by following a service level specified thereby, judges persons to whom the corresponding function is permitted to be used or disclosed.

Specifically, the data "proV1RemoteMainteSvcLevel" indicates being used only by a production division of the electronic device 3 when at a level "0" as shown in FIG. 6. Also, when at a level "1", it indicates being able to be used by the above production division and service footholds (sales) in the vender. Also, at a level "2", it indicates being able to be used by the above service footholds (sales) and service footholds (agents) outside the vender. When at a level "3", it indicates being able to be used by the above production division, the above service footholds (sales), the service footholds (agents) outside the vender and a manager on the customer side. When at a level "4", it indicates being able to be used by the above production division, the above service footholds (sales), the service footholds (agents) outside the vender, a manager on the customer side and general users.

Below, an example of the remote maintenance management data 85 shown in FIG. 4 will be explained.

FIG. 7 is a view for explaining an example of the remote maintenance management data 85 shown in FIG. 4.

As shown in FIG. 7, in this example, the remote maintenance management data 85 comprises seven entries, each of which is added an Index number from "1" to "7".

An entry having an Index number "1" is set "01" indicating a monitoring function of the MIB II 83 as "proV1RemoteMainteFunction", "161" indicating the SNMP as "proV1RemoteMainteProtoType", "100" as "proV1RemoteMainteProtoVer", and a level "3" as "proV1RemoteMainteSvcLevel".

Also, an entry having an Index number "2" is set "02" indicating a monitoring function of the private MIB 82 as "proV1RemoteMainteFunction", "161" indicating the SNMP as "proV1RemoteMainteProtoType", "100" as "proV1RemoteMainteProtoVer" and a level "3" as "proV1RemoteMainteSvcLevel".

Also, an entry having an Index number "3" is set "21" indicating a function of referring to a status of the electronic device 3 as "proV1RemoteMainteFunction", "80" indicating the HTTP as "proV1RemoteMainteProtoType", "110" as "proV1RemoteMainteProtoVer", "/service/status" as "proV1RemoteMaintePath" and a level "1" as "proV1RemoteMainteSvcLevel".

Also, an entry having an Index number "4" is set "31" indicating a function of collecting record data (log) of the electronic device 3 as "proV1RemoteMainteFunction", "20" indicating the FTP as "proV1RemoteMainteProtoType", "/var/log" as "proV1RemoteMaintePath" and a level "1" as "proV1RemoteMainteSvcLevel".

Also, an entry having an Index number "5" is set "41" indicating a function of referring to or changing a set value or composition information of the electronic device 3 as "proV1RemoteMainteFunction", "80" indicating the HTTP as "proV1RemoteMainteProtoType", "110" as "proV1RemoteMainteProtoVer", "/setup" as "proV1RemoteMaintePath" and a level "3" as "proV1RemoteMainteSvcLevel".

Also, an entry having an Index number "6" is set "51" indicating a function of executing diagnosis processing of the electronic device 3 as "proV1RemoteMainteFunction", "80" indicating the HTTP as "proV1RemoteMainteProtoType", "110" as "proV1RemoteMainteProtoVer", "/service/diag" as "proV1RemoteMaintePath" and a level "1" as "proV1RemoteMainteSvcLevel".

Also, an entry having an Index number "7" is set "61" indicating a function of downloading software to the electronic device 3 as "proV1RemoteMainteFunction", "26" indicating the FTP as "proV1RemoteMainteProtoType", "/temp/firmware" as "proV1RemoteMaintePath" and a level "1" as "proV1RemoteMainteSvcLevel".

Below, an operation example of the communication system 1 shown in FIG. 1 will be explained.

FIG. 8 is a flowchart for explaining the operation example.

Step ST1:

When the electronic device 3 is connected to the LAN 5 shown in FIG. 1, the SNMP manager 80 shown in FIG. 3 realized as a result that the CPU 18 of the computer 2 executes a predetermined program obtains an IP address or a host name of the electronic device 3 by "discovery" (automatic recognition) and stores the same for example in the MIB 84 of the computer 2.

Step ST2:

The SNMP manager 80 transmits a request "GET REQUEST" regulated by the SNMP communication to the SNMP agent 81 of the electronic device 3 from the LAN_I/F 17 shown in FIG. 2 via the LAN 5.

Due to this, the SNMP agent 81 shown in FIG. 3 realized as a result that the CPU 27 of the electronic device 3 executes a predetermined program reads the remote maintenance management data 85 stored in the private MIB 82 and transmits the remote maintenance management data 85 from the LAN_I/F 26 shown in FIG. 2 to the computer 2 via the LAN 5.

The computer 2 stores the remote maintenance management data 85 received from the electronic device 3 in the MIB 84 shown in FIG. 3.

Step ST3:

The SNMP manager 80 executes the GUI (Graphical User Interface) and displays on the display 16 shown in FIG. 2, for example, a screen 100 of a maintenance menu shown in FIG. 9 in accordance with the remote maintenance management data 85 stored in the MIB 84 in the step ST2.

Step ST4:

After a user of the computer 2 specifies an icon corresponding to the electronic device 3 for example on the screen 100 shown in FIG. 9, the user specifies an item corresponding to the maintenance function and successively specifies an item corresponding to status reference.

Figure 10:
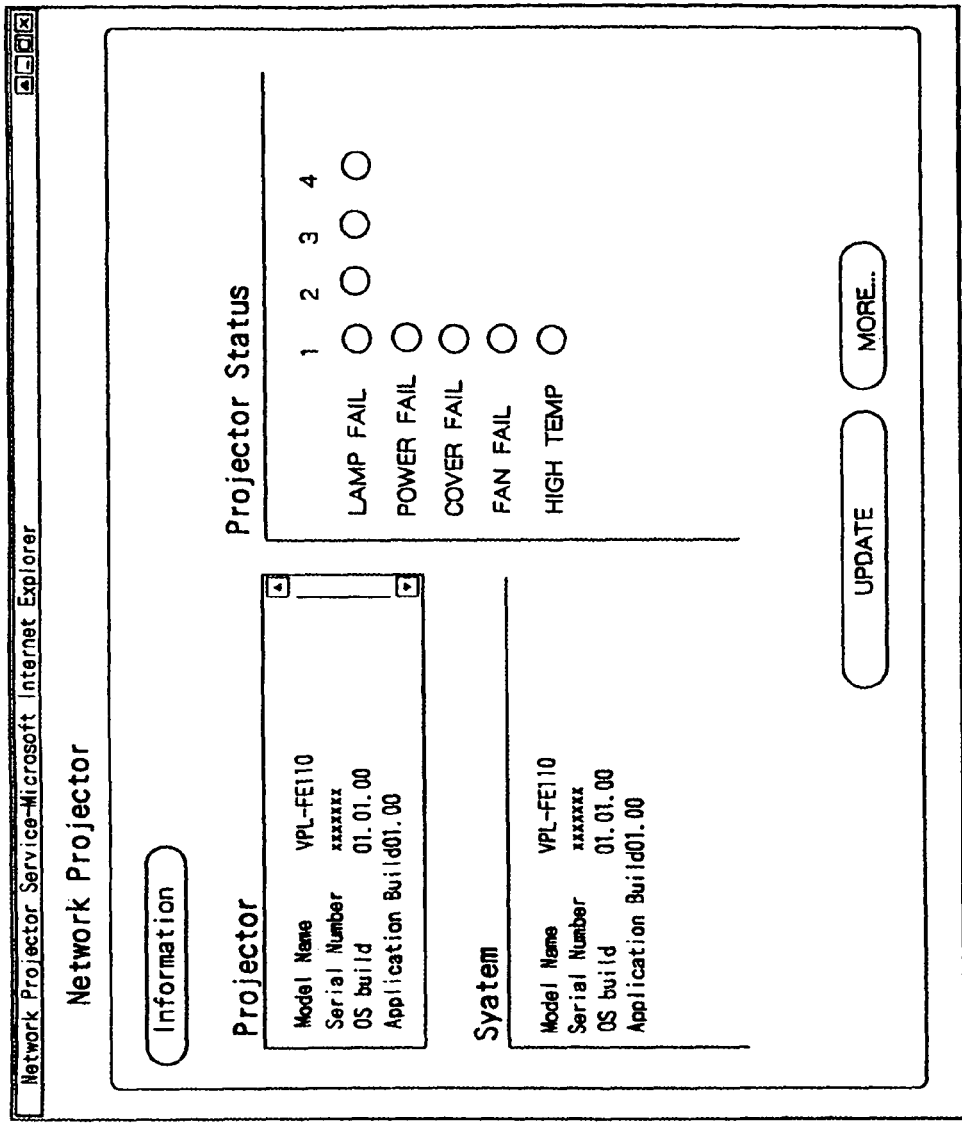
FIG. 10 is a view for explaining a display format of status data on the screen of the computer in FIG. 8.

Due to this, the SNMP manager 80 reads a program corresponding to the status reference function from the ROM/RAM 11 or the HDD 12 shown in FIG. 2 and executes the same, performs communication with the SNMP agent 81 via the LAN 5, receives status data (status data of the present invention) of the electronic device 3 and displays for example a screen 101 shown in FIG. 10 in accordance therewith on the display 16.

At this time, communication is performed between the SNMP manager 80 and the SNMP agent 81 by using the HTTP as a communication protocol based on information, such as a kind of a protocol in the remote maintenance management data 85 shown in FIG. 7.

Step ST5:

The user of the computer 2 successively specifies an item corresponding to log collection for example on the screen 100 shown in FIG. 9.

Due to this, the SNMP manager 80 reads a program corresponding to a log collective function from the ROM/RAM 11 or the HDD 12 shown in FIG. 2 and executes the same, performs communication with the SNMP agent 81 via the LAN 5, receives record (log) data from the electronic device 3 and displays a screen in accordance therewith on the display 16.

At this time, communication between the SNMP manager 80 and the SNMP agent 81 by using the FTP as a communication protocol is performed based on information, such as a kind of a protocol in the remote maintenance management data 85 shown in FIG. 7.

Step ST6:

The user of the computer 2 successively specifies an item corresponding to software download for example on the screen 100 shown in FIG. 9.

Figure 11:
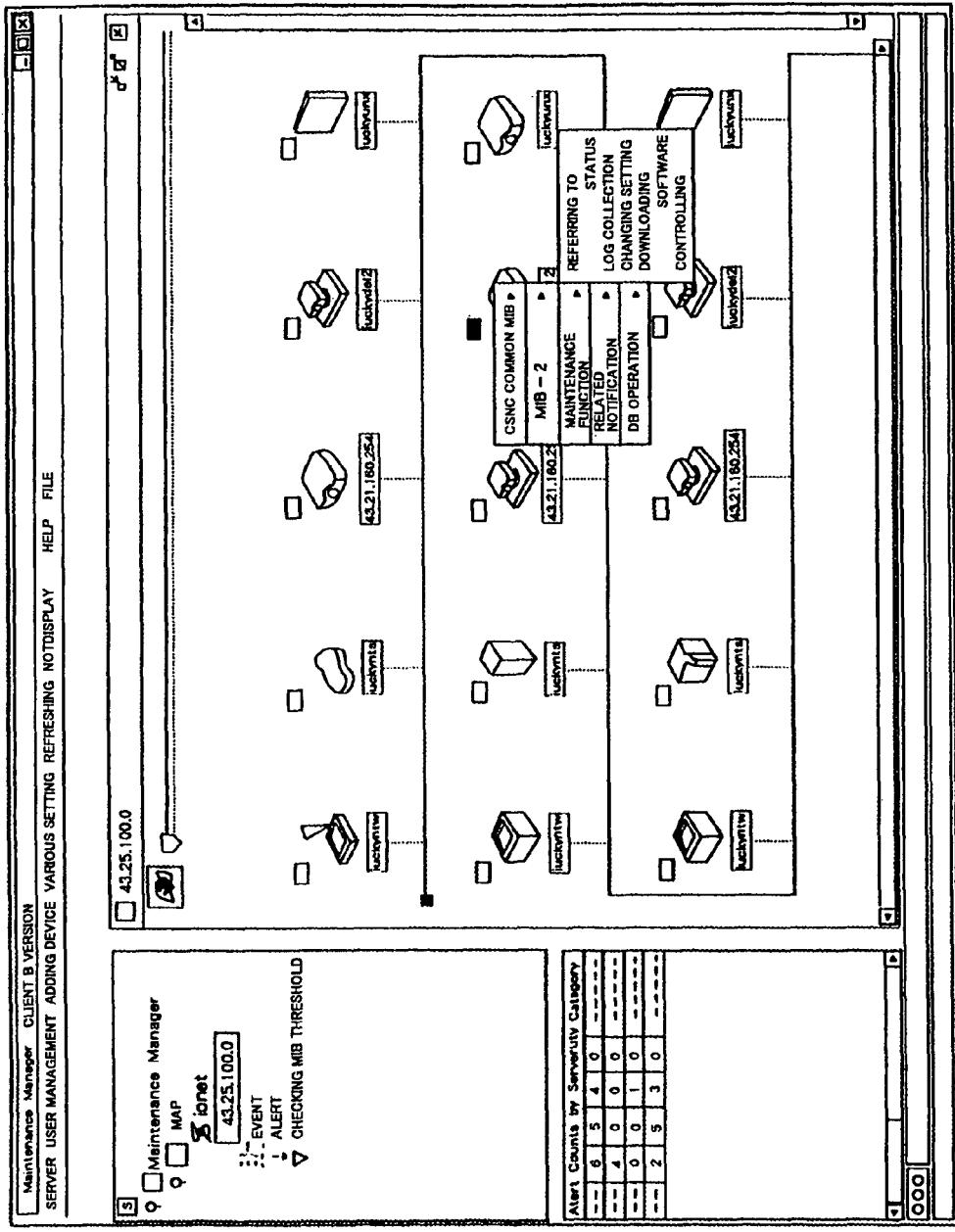
FIG. 11 is a view for explaining a display on the screen of the computer at the time of downloading software in FIG. 8.

Due to this, the SNMP manager 80 displays a screen 102 shown in FIG. 11 on the display 16, reads predetermined software (program) from the ROM/RAM 11 or the HDD 12 shown in FIG. 2 in response to an operation on the screen 102 by the user, performs communication with the SNMP agent 81 via the LAN 5 and downloads the read software to the electronic device 3.

At this time, communication is performed between the SNMP manager 80 and the SNMP agent 81 by using the FTP as a communication protocol based on information, such as a kind of a protocol in the remote maintenance management data 85 shown in FIG. 7.

Step ST7:

The SNMP agent 81 of the electronic device 3 executes the software downloaded in the step ST6 after performing initialization processing.

Step ST8:

The SNMP manager 80 executes a program for example relating to a variety of functions shown in FIG. 5, monitors and controls an operation (processing) of the electronic device 3.

As explained above, according to the communication system 1, the computer 2 performs a communication with the electronic device 3 by using a communication protocol corresponding to a kind of a function to be executed (specified) based on information, such as a kind of a protocol indicated by the remote maintenance management data 85 received from the electronic device 3.

As a result, it becomes unnecessary for the administrator of the computer 2 to set the communication protocol used in the communication with respective electronic devices 3 and the load is reduced.

Also, the electronic device 3 is capable of performing communication with the computer 2 by using a communication protocol suitable to itself.

Also, according to the communication system 1, by holding the above remote maintenance management data 85 in the electronic device 3 and the computer 2 and performing monitoring and maintenance of the electronic device 3 based on the remote maintenance management data 85 by the computer 2, monitoring and maintenance of the electronic device 3 by the computer 2 can be integrally performed and a load on the user of the computer 2 can be reduced.

Namely, it becomes unnecessary for the user of the computer 2 to inquire an IP address, communication protocol of the electronic device 3 and an access path to the memory region of the electronic device 3 prior to the maintenance of the electronic device 3.

Second Embodiment

Figure 12:
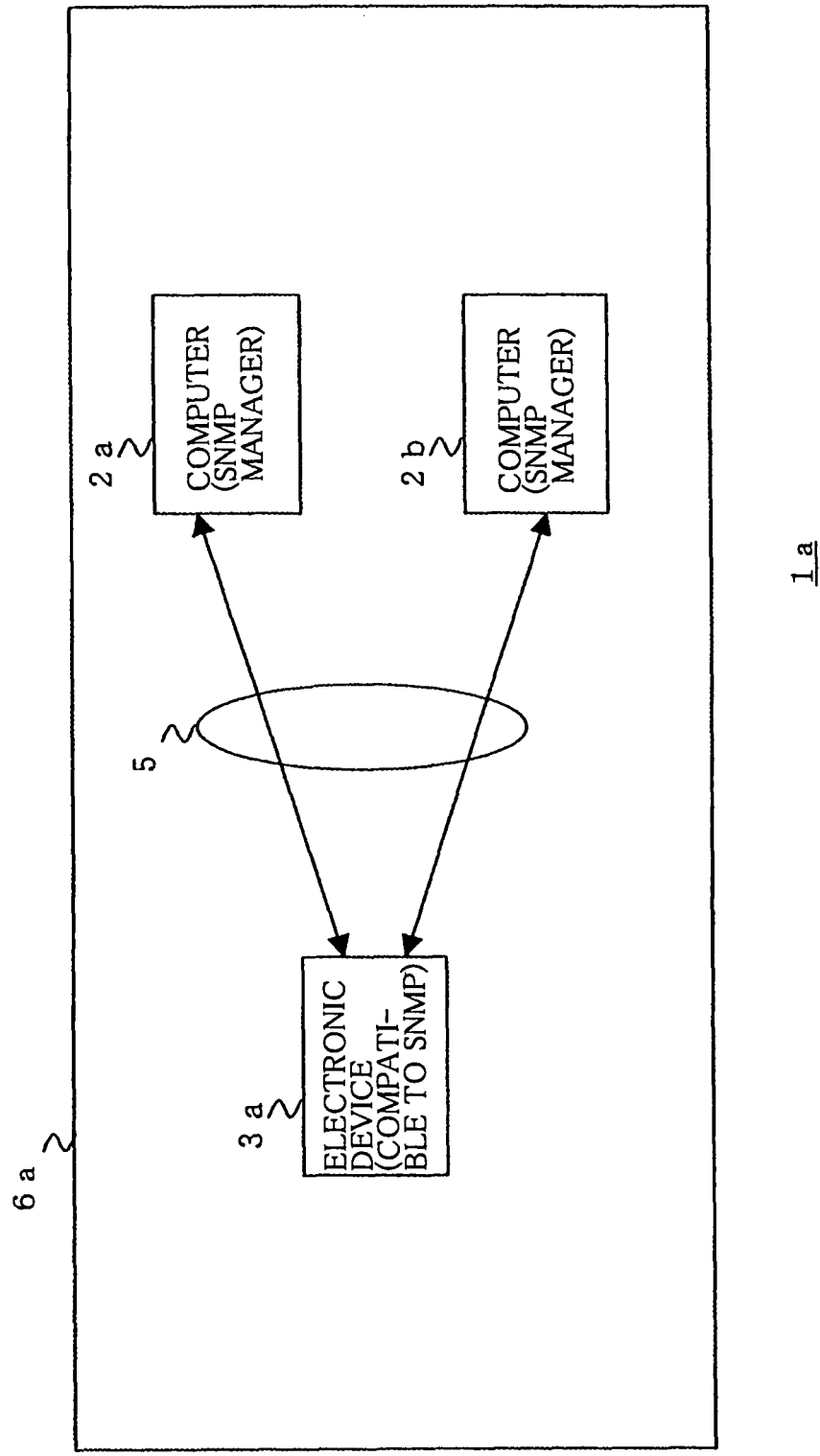
FIG. 12 is a view of the overall configuration of a communication system of a second embodiment of the present invention.

FIG. 12 is a view of the overall configuration of a communication system 1a of a second embodiment of the present invention.

As shown in FIG. 12, in the communication system 1a, for example computers 2a and 2b and an electronic device 3a are connected via a LAN (Local Area Network) 5 in an area 6a.

Also, the computers 2a and 2b and the electronic device 3a performs communication via the LAN 5 in the area 6a.

Here, the computers 2a and 2b correspond to the computer of the present invention and the electronic device 3a corresponds to the electronic device of the present invention.

The computers 2a and 2b and the electronic device 3a have a function of performing processing relating to the SNMP as a connectionless type network management protocol operating on a UDP transport layer of the TCP/IP.

The computers 2a and 2b have for example all the configuration of the computer 2 of the first embodiment.

Also, the electronic device 3a has for example all the configuration of the electronic device 3 of the first embodiment.

In the communication system 1a shown in FIG. 12, the computers 2a and 2b and the electronic device 3a perform SNMP communication and when abnormality or an event occurs in the electronic device 3a, the electronic device 3a transmits a Trap (an interruption signal of the present invention) to the computers 2a and 2b and notifies the fact.

In the electronic device 3a, a Trap transmission destination table for managing transmission addresses of the Trap is prepared.

In the present embodiment, the computers 2a and 2b automatically write own IP addresses to the Trap transmission destination table of the electronic device 3a.

[Computers 2a and 2b]

Figure 13:
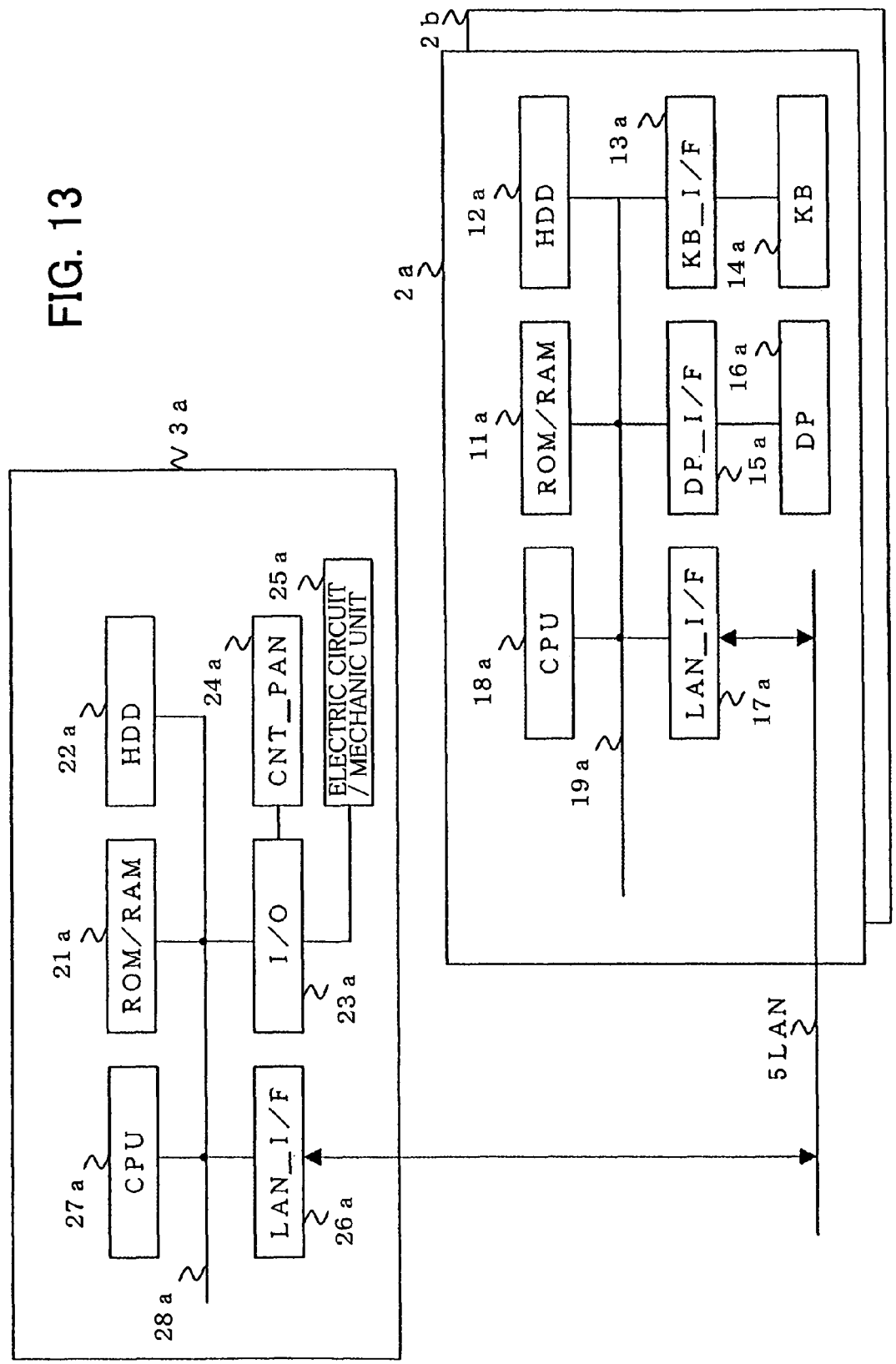
FIG. 13 is a view of the configuration of the computer and electronic device shown in FIG. 12.

FIG. 13 is a view of the configuration of the computer 2a and the electronic device 3a shown in FIG. 12.

Note that the computer 2b has basically the same configuration as that of the computer 2a.

As shown in FIG. 13, in the computer 2a, for example a ROM/RAM 11a, an HDD 12a, a KB_I/F 13a, a DP_I/F 15a, a LAN_I/F 17a and a CPU 18a are connected via an internal bus 19a.

Here, the LAN_I/F 17a corresponds to an interface means of the computer of the present invention and the CPU 18a corresponds to a control means of the computer of the present invention.

The ROM/RAM 11a stores a program for realizing a variety of functions provided by the computer 2a including the SNMP processing function.

The HDD 12a stores various data used by processing in the computer 2a.

The KB_I/F 13a is connected an operation means, such as a keyboard KB 14a and a mouse.

The DP_I/F 15a is connected to a display DP 16a.

The LAN_I/F 17a is connected to the LAN 5.

The CPU 18a realizes a variety of functions, such as the SNMP processing function, for example, based on a program read from the ROM/RAM 11a.

[Electronic Device 3a]

As shown in FIG. 13, in the electronic device 3a, for example, a ROM/RAM 21a, an HDD 22a, an I/O 23a, a LAN_I/F 26a and a CPU 27a are connected via an internal bus 28a.

Here, the LAN_I/F 26a corresponds to the interface means of the electronic device of the present invention, the CPU 27a corresponds to the control means of the electronic device of the present invention and the ROM/RAM 21a and the HDD 22a correspond to the memory means of the electronic device of the present invention.

In the present embodiment, the electronic device 3a is for example a television device, an audio device, lighting and other electronic devices.

In the ROM/RAM 21a, a program for realizing a variety of functions provided by the electronic device 3a including the SNMP processing function is stored.

In the HDD 22a, various data used by processing in the electronic device 3a is stored.

The I/O 23a is connected to a control panel 24a and an electric circuit/mechanic unit 25a, etc.

The LAN_I/F 26a is connected to the LAN 5.

The CPU 27a realizes a variety of functions, such as the SNMP processing function, based on a program read from the ROM/RAM 21a.

[SNMP Communication Processing]

Next, the SNMP communication processing performed between the computer 2a and the electronic device 3a shown in FIG. 12 will be explained.

Figure 14:
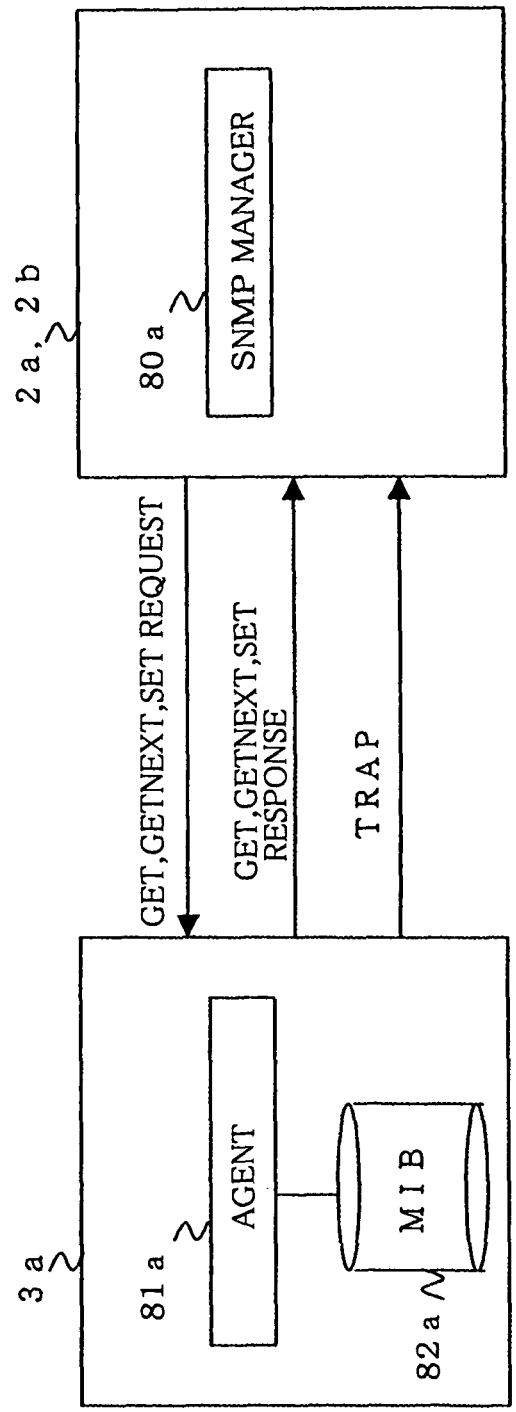
FIG. 14 is a view for explaining the SNMP communication processing.

FIG. 14 is a view for explaining the SNMP communication processing.

FIG. 14 is a view for explaining the SNMP communication processing performed between the computers 2a and 2b and the electronic device 3a.

The CPU 18a of the computer 2a executes a program (a program of the fourth invention) read from the ROM/RAM 11a or the HDD 12a to realize the SNMP manager 80a.

Also, the CPU 27a of the electronic device 3a executes a program (a program of the fifth invention) read from the ROM/RAM 11a or the HDD 12a to realize the SNMP agent 81a.

Also, the HDD 22a of the electronic device 3a stores for example data of the MIB (Management Information Base) 82a.

The SNMP agent 81a obtains information to be managed and notifies the information to the SNMP manager 80a by using a network management protocol of the SNMP. The information needing to be managed is stored in the MIB 82a as a database.

The SNMP agent 81a transmits information in the MIB 82a to the SNMP manager 80a based on a request from the SNMP manager 80a. Note that when an irregular event occurs, such that the electronic device 3a reboots, the SNMP agent 81a transmits a Trap to the SNMP manager 80a.

A request for obtaining and setting a value of an object to be managed is given from the SNMP manager 80a to the SNMP agent 81a, and the SNMP agent 81a responds to the request. Also, the SNMP agent 81a notifies abnormality and an event occurred in the electronic device 3a to the SNMP manager 80a. To realize the functions, five operations below are regulated in the SNMP.

GET REQUEST: reading data stored in an MIB variable specified from the MIB 82a

GETNEXT REQUEST: reading next data of a specified MIB variable by following a procedure of the MIB 82a SET REQUEST: setting an MIB variable to specified data GET RESPONSE: a response from the SNMP agent 81a to a request Trap: notifying an occurrence of abnormality and an event from the SNMP agent 81a to the SNMP manager 80a The MIB 82a stores definition of an object (an amount or a field) provided by the SNMP agent 81a to the SNMP manager 80a. The object defined by the MIB 82a is arranged in unit of a group and relates to respective layers or a protocol in a protocol stack of a certain group, while other group as a whole relates to a system.

The MIB 82a is added an object identifier to uniquely identify any management object and the object identifier has a tree structure starting from a root element.

Figures 15, 16:
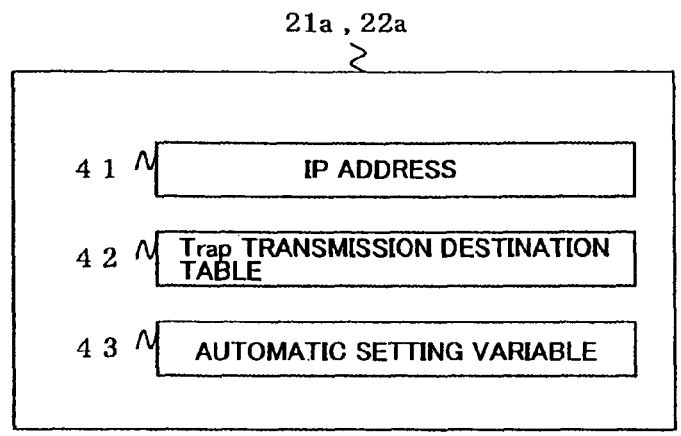
FIG. 15 is a view for explaining data to be stored in a ROM/RAM and an HDD of the electronic device shown in FIG. 13.
FIG. 16 is a view for explaining a Trap transmission destination table shown in FIG. 15.

As shown in FIG. 15, in the ROM/RAM 21a or the HDD 22a, an IP address 41, a Trap transmission destination table 42 (table data of the present invention) and an automatic setting variable 43 of the electronic device 3a are stored.

Here, the Trap transmission destination table 42 is stored in the MIB 82a.

In the present embodiment, the SNMP agent 81a of the electronic device 3a and the SNMP managers 80a of the computers 2a and 2b shown in FIG. 14 negotiate via the LAN 5 and automatically set (the Plug and Play) the Trap transmission destination table stored in the MIB 82a.

[Trap Transmission Destination Table 42]

FIG. 16 is a view for explaining the Trap transmission destination table 42.

As shown in FIG. 16, the Trap transmission destination table 42 is named "proV1TrapDestTable" and composed of a plurality of entries "proV1TrapDestEntry".

Each entry "proV1TrapDestEntry" is composed for example of 32 bits of an integer type index number "proV1TrapDestIdx", a Trap transmission destination address "proV1TrapDestAddress" in which an IP address is stored (transmission destination data of the present invention), and a status of the entry "proV1TrapDestStatus" (status data of the present invention).

FIG. 17 is a view for explaining a value of the status of the entry "proV1TrapDestStatus" shown in FIG. 16 and meaning thereof.

As shown in FIG. 17, when the status "proV1TrapDestStatus" is "1", it indicates "valid", when "2", it indicates a state of an adding request of a line entry from the SNMP manager 80a to the SNMP agent 81a, when "13", it indicates ending of an operation of generating a line entry from the SNMP agent 81a to the SNMP manager 80a, when "4", it indicates invalidity of the entry, and when "5", it indicates that an IP address 41 is set being fixed.

Below, processing at the time of starting up, rebooting or initializing the electronic device 3a will be explained.

Figure 18:
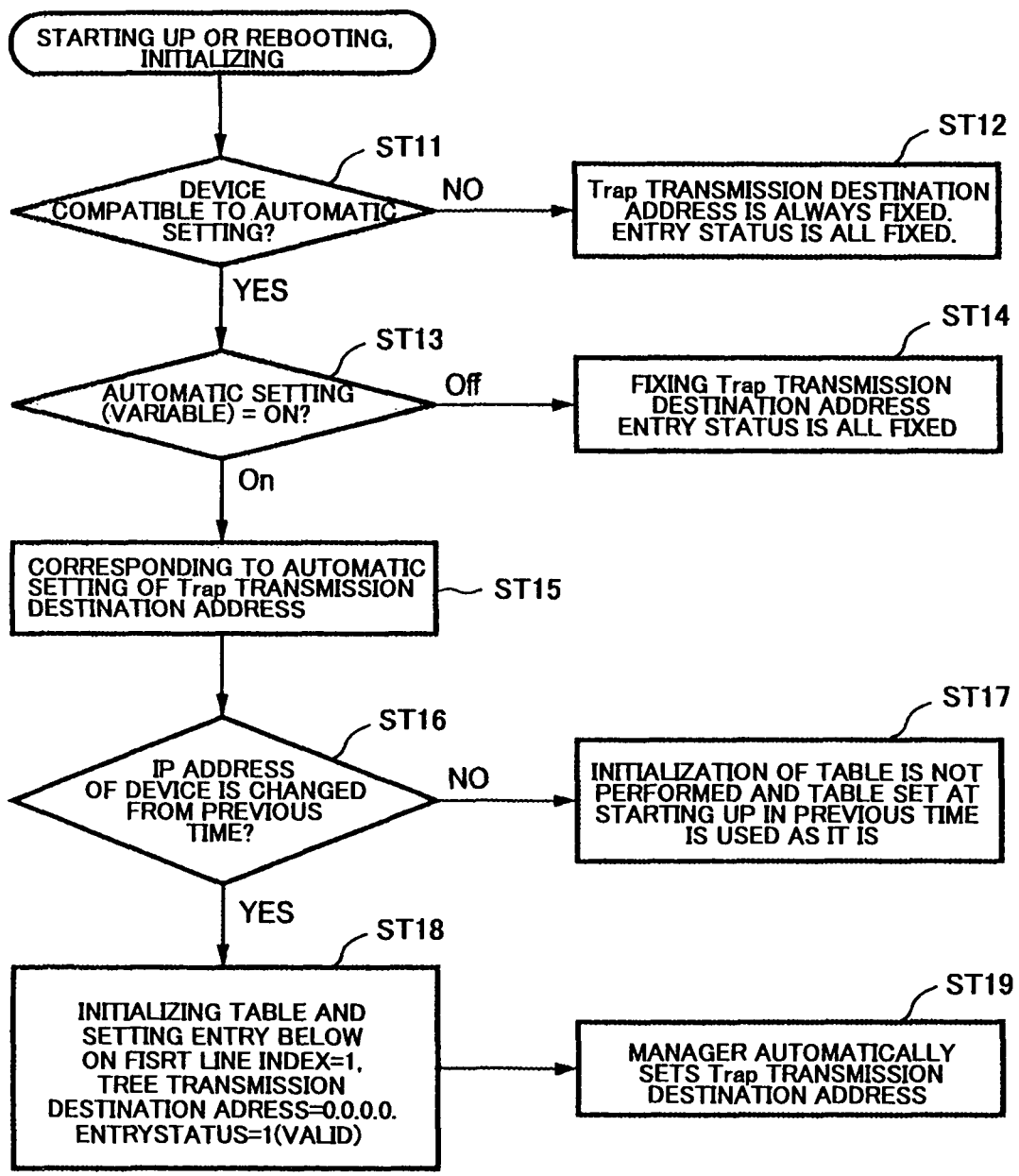
FIG. 18 is a flowchart for explaining processing at the time of starting up, rebooting or initializing the electronic device shown in FIG. 12.

FIG. 18 is a flowchart for explaining the processing.

Step ST11:

The SNMP agent 81a shown in FIG. 14 judges whether the electronic device 3a is a device compatible to automatic setting or not, and proceeds to processing of the step ST13 when judged to be compatible to automatic setting, while not, proceeds to processing of the step ST12.

Step ST12:

The SNMP agent 81a sets the status of the all entries "EntryStatus" of the Trap transmission destination table 42 shown in FIG. 16 to be fixed.

Step ST13:

The SNMP agent 81a judges whether the automatic setting variable 43 shown in FIG. 15 is at "ON" (indicating automatic setting) or not, and proceeds to processing of the step ST15, while not, proceeds to processing of the step ST14.

Step ST14:

The SNMP agent 81a sets the status of the all entries "EntryStatus" of the Trap transmission destination table 42 shown in FIG. 16 to be fixed.

Step ST15:

Thereby, the SNMP agent 81a corresponds to automatic setting of the Trap transmission destination table 42.

Step ST16:

The SNMP agent 81a judges whether the IP address 41 of the electronic device 3a has changed from the previous time of being started up, rebooted or initialized, and proceeds to processing of the step ST18 when judged to be changed, while not, proceeds to processing of the step ST17.

Step ST17:

The SNMP agent 81a does not initialize the Trap transmission destination table 42 and uses what set at the previous starting up as it is.

Step ST18:

The SNMP agent 81a initializes the Trap transmission destination table 42.

Namely, the SNMP agent 81a sets an entry of the Trap transmission destination table 42 to a first line and sets Index=1, a Trap transmission destination address=0. 0. 0. 0 (initial state), and an "EntryStatus"=1 (valid).

Step ST19:

As will be explained later on, continued from the step ST18, the SNMP manager 80a shown in FIG. 14 performs the automatic setting of the Trap transmission destination table 42.

Below, processing at the time that the SNMP agent 81a shown in FIG. 14 receives a request "SetRequest" from the SNMP manager 80a will be explained.

FIG. 19 is a view for explaining the processing.

As shown in FIG. 19A, before processing, when the SNMP agent 81a receives a "SetRequest" (proV1TrapDestEntryStatus, n, 1) from the SNMP manager 80a in a state that Index=n already exists in the Trap transmission destination table 42 and the "EntryStatus"=1 (valid), an entry of the Index=n in the Trap transmission destination table 42 is left as it is. Then, the SNMP agent 81a transmits to the SNMP manager 80a "GetResponse" indicating that normal processing has performed.

As shown in FIG. 19B, before processing, when the SNMP agent 81a receives "SetRequest" (proV1TrapDestEntryStatus, n, 1) from the SNMP manager 80a in a state that Index=n already exists in the Trap transmission destination table 42 and "EntryStatus"=3 (underCreation), an entry of the Index=n in the Trap transmission destination table 42 is validated. Then, the SNMP agent 81a transmits to the SNMP manager 80a "GetResponse" indicating that normal processing has performed.

After the processing, the "EntryStatus" of the entry of the index=n in the Trap transmission destination table 42 is set from "3" to "1".

As shown in FIG. 19C, before processing, when the SNMP agent 81a receives "SetRequest" (proV1TrapDestEntryStatus, n, 1) from the SNMP manager 80a in a state that Index=n already exists in the Trap transmission destination table 42 and the "EntryStatus"=4 (invalid) or 5 (fixed), the Trap transmission destination table 42 is not changed.

After the processing, the Trap transmission destination table 42 is not changed.

As shown in FIG. 19D, before processing, when the SNMP agent 81a receives from the SNMP manager 80a "SetRequest" (proV1TrapDestEntryStatus, n, 2) indicating adding of an entry in a state a line of Index=n does not exist in the Trap transmission destination table 42, the SNMP agent 81a adds a new entry (line) having a Trap transmission address=0, 0, 0, 0 in the Trap transmission destination table 42. Then, the SNMP agent 81a transmits to the SNMP manager 80a "GetResponse" indicating that normal processing has performed.

After the processing, the "EntryStatus" of the added entry in the Trap transmission destination table 42 is set to be "3".

As shown in FIG. 19E, when the SNMP agent 81a receives from the SNMP manager 80a "SetRequest" (proV1TrapDestEntryStatus, n, 2) in a state that Index=n already exists in the Trap transmission destination table 42, "GetResponse" indicating an error is transmitted because the entry already exists.

After the processing, values in the Trap transmission destination table 42 are not changed.

As shown in FIG. 19F, when the SNMP agent 81a receives from the SNMP manager 80a "SetRequest" (proV1TrapDestEntryStatus, n, 3), "SetRequest" (proV1TrapDestEntryStatus, n, 4) and "SetRequest" (proV1TrapDestEntryStatus, n, 5) regardless of a state before the processing, "GetResponse" indicating an error is transmitted from the SNMP agent 81a to the SNMP manager 80a. In this case, values of the Trap transmission destination table 42 are not changed.

Below, a case where the automatic setting variable 43 shown in FIG. 15 is at "OFF" will be explained.

In this case, as shown in FIG. 20, a Trap transmission destination address of an entry of INDEX=1 in the Trap transmission destination table 42 is set to "0. 0. 0. 0" and the status of the entry is set to "5 (fixed)".

Below, a case where the Trap transmission destination table 42 is set on the electronic device 3a side will be explained.

In this case, for example, as shown in FIG. 21, "XX. XX. XX. XX" as an IP address of the computer 2a is set as a Trap transmission address of an entry of INDEX=1 in the Trap transmission destination table 42, and the status is set to "5 (fixed)". Also, "YY. YY. YY. YY" as an IP address of the computer 2b is set as a Trap transmission address of an entry of INDEX=2 in the Trap transmission destination table 42, and the status is set to "5 (fixed)".

Below, a case where the automatic setting variable 43 is switched from "OFF" to "ON" will be explained.

For example, as shown in FIG. 22A, when the automatic setting variable 43 is switched from "OFF" to "ON" at the time the Trap transmission destination table 42 is in the state as explained in FIG. 21, as shown in FIG. 22B, the statuses of entries on the first and second lines are both rewritten to "1 (valid)".

Below, a case where the automatic setting variable 43 is switched from "ON" to "OFF" will be explained.

For example, as shown in FIG. 23A, when the automatic setting variable 43 is switched from "ON" to "OFF" at the time the Trap transmission destination table 42 is in the state as explained in FIG. 22B, as shown in FIG. 23B, the statuses of the entries on the first and second lines are both rewritten to "5 (fixed)".

Below, an operation example of the communication system 1a shown in FIG. 12 will be explained.

First Operation Example

In this operation example, the case will be explained where in a state that a Trap transmission address of the entry on the first line in the Trap transmission destination table 42 is "0. 0. 0. 0" and the status is "1 (valid)", the SNMP manager 80a sets an IP address of the computer 2a as the Trap transmission address to the electronic device 3a.

FIG. 24 is a flowchart for explaining the operation example.

Step ST21:

The SNMP manager 80a realized by the CPU 18a of the computer 2a shown in FIG. 13 generates a request "SetRequest" (proV1TrapDestAddress. [1], XX. XX. XX. XX) and transmits the same from the LAN_I/F 17a to the electronic device 3a via the LAN 5.

Step ST22:

The SNMP agent 81a realized by the CPU 27a of the electronic device 3a shown in FIG. 13 makes an access to the ROM/RAM 21a or the HDD 22a in response to the request received from the SNMP manager 80a via the LAN_I/F 26a shown in FIG. 13 in the step ST21 and changes the Trap transmission address of the first entry in the Trap transmission destination table 42 shown in FIG. 16 to "XX. XX. XX. XX".

Thereby, "XX. XX. XX. XX" as an IP address (identification data of the computer in the present invention) of the computer 2a is automatically set to the first entry in the Trap transmission destination table 42.

Step ST23:

The SNMP agent 81a transmits a response "GetResponse" indicating that normal processing has completed from the LAN_I/F 26a to the computer 2a via the LAN 5.

Second Operation Example

In this operation example, the case will be explained where in a state that a Trap transmission address of the entry on the first line in the Trap transmission destination table 42 is not "0.0.0.0" (a state the IP address of the computer 2a is already set), the SNMP manager 80a of the computer 2b sets an IP address of the computer 2b as the Trap transmission address to the electronic device 3a.

FIG. 25 is a flowchart for explaining the operation example.

Step ST31:

The SNMP manager 80a realized by the CPU 18a of the computer 2b shown in FIG. 13 generates a request "SetRequest" (proV1TrapDestEntryStatus. [max(index)+1], 2) and transmits the same from the LAN_I/F 17a to the electronic device 3a via the LAN 5.

Step ST32:

The SNMP agent 81a realized by the CPU 27a of the electronic device 3a shown in FIG. 13 makes an access to the ROM/RAM 21a or the HDD 22a in response to the request received from the SNMP manager 80a via the LAN_I/F 26a shown in FIG. 13 in the step ST31 and prepares an entry having a status of "3 (under Creation)" as shown in FIG. 26A on the second line in the Trap transmission destination table 42 shown in FIG. 16.

Step ST33:

The SNMP agent 81a transmits a response "GetResponse" indicating that normal processing has completed from the LAN_I/F 26a to the computer 2b via the LAN 5.

Step ST34:

The SNMP manager 80a of the computer 2b generates a request "SetRequest" (proV1TrapDestAddress. [max(index)+1], YY. YY. YY. YY) and transmits the same from the LAN_I/F 17a to the electronic device 3a via the LAN 5.

Step ST35:

The SNMP agent 81a of the electronic device 3a shown in FIG. 13 makes an access to the ROM/RAM 21a or the HDD 22a in response to the request received from the SNMP manager 80a via the LAN_I/F 26a shown in FIG. 13 in the step ST34 and sets "YY. YY. YY. YY" to a Trap transmission address of the second entry in the Trap transmission destination table 42 as shown in FIG. 26B.

Thereby, "YY. YY. YY. YY" as the IP address of the computer 2b is automatically set to the second entry in the Trap transmission destination table 42.

Step ST36:

The SNMP agent 81a transmits a response "GetResponse" indicating that normal processing has completed from the LAN_I/F 26a to the computer 2b via the LAN 5.

Step ST 37:

The SNMP manager 80a of the computer 2b generates a request "SetRequest" (proV1TrapDestEntryStatus. [max(index)+1], 1) and transmits the same from the LAN_I/F 17a to the electronic device 3a via the LAN 5.

Step ST38:

The SNMP agent 81a makes an access to the ROM/RAM 21a or the HDD 22a in response to the request received from the SNMP manager 80a via the LAN_I/F 26a shown in FIG. 13 in the step ST37 and sets the status on the second line in the Trap transmission destination table 42 to "1 (valid)" as shown in FIG. 26C.

Thereby, the IP address of the computer 2b set to the Trap transmission destination table 42 becomes valid as the Trap transmission address.

Step ST39:

The SNMP agent 81a transmits a response "GetResponse" indicating that normal processing has completed from the LAN_I/F 26a to the computer 2b via the LAN 5.

Note that an entry including an IP address automatically set from the SNMP manager 80a to the Trap transmission destination table 42 is written to the ROM/RAM 21a or the HDD 22a after the automatic setting processing is completely ended.

Third Operation Example

In this operation example, the case will be explained where an address change request of an address is generated from the SNMP manager 80a of the computer 2b almost simultaneously with an address change request from the SNMP manager 80a of the computer 2a to the entry on the first line in the Trap transmission destination table 42.

Figure 27:
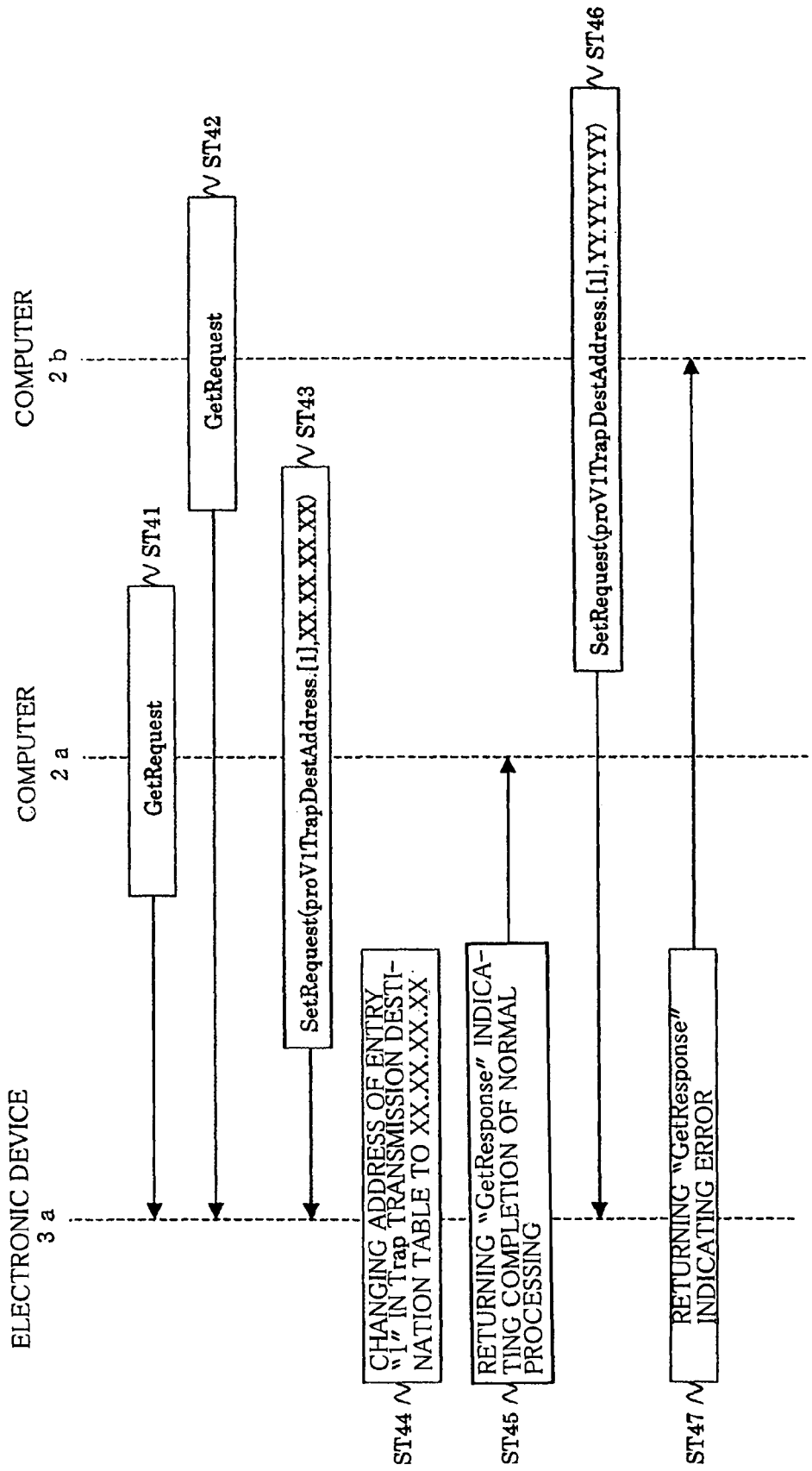
FIG. 27 is a flowchart for explaining the case where an address change request from the SNMP manager of the computer is generated almost simultaneously with an address change request of an address generated from an SNMP manager of another computer to an entry on the first line of the Trap transmission destination table.

FIG. 27 is a flowchart for explaining the operation example.

Step ST41:

The SNMP manager 80a of the computer 2a transmits a request "GetRequest" from the LAN_I/F 17a to the electronic device 3a via the LAN 5 shown in FIG. 13 and confirms that the Trap transmission address of the entry on the first line in the Trap transmission destination table 42 is "0. 0. 0. 0" and the status is "1 (valid)".

Step ST42:

The SNMP manager 80a of the computer 2b transmits a request "GetRequest" from the LAN_I/F 17a to the electronic device 3a via the LAN 5 shown in FIG. 13 and confirms that the Trap transmission address of the entry on the first line in the Trap transmission destination table 42 is "0. 0. 0. 0" and the status is "1 (valid)".

Step ST43:

The SNMP manager 80a of the computer 2a generates a request "SetRequest" (proV1TrapDestAddress. [1], XX. XX. XX. XX) and transmits the same from the LAN_I/F 17a to the electronic device 3a via the LAN 5.

Step ST44:

The SNMP agent 81a of the electronic device 3a makes an access to the ROM/RAM 21a or the HDD 22a in response to the request received from the SNMP manager 80a of the computer 2a via the LAN_I/F 26a shown in FIG. 13 in the step ST43 and changes the Trap transmission address of the first entry in the Trap transmission destination table 42 shown in FIG. 16 to "XX. XX. XX. XX".

Thereby, "XX. XX. XX. XX" as an IP address of the computer 2a is automatically set to the first entry in the Trap transmission destination table 42.

Step ST45:

The SNMP agent 81a transmits a response "GetResponse" indicating that normal processing has completed from the LAN_I/F 26a to the computer 2a via the LAN 5.

Step ST46:

Continuously, the SNMP manager 80a of the computer 2b generates a request "SetRequest" (proV1TrapDestAddress. [1], YY. YY. YY. YY) and transmits the same from the LAN_I/F 17a to the electronic device 3a via the LAN 5.

Step ST47:

The SNMP agent 81a transmits a response "GetResponse" indicating an error from the LAN_I/F 26a to the computer 2b via the LAN 5.

As explained above, according to the communication system 1a, even when an address change request of an address is generated from the SNMP manager 80a of the computer 2b almost simultaneously with an address change request from the SNMP manager 80a of the computer 2a to the entry on the first line in the Trap transmission destination table 42, the IP address of the computer 2a which generated the address change request first can be set as the Trap transmission address and the address change request of the computer 2b made after that can be processed as an error.

Fourth Operation Example

In this operation example, the case where an adding request of an entry on the second line in the Trap transmission destination table 42 is generated from the computer 2b almost simultaneously with that from the computer 2a will be explained.

Figure 28:
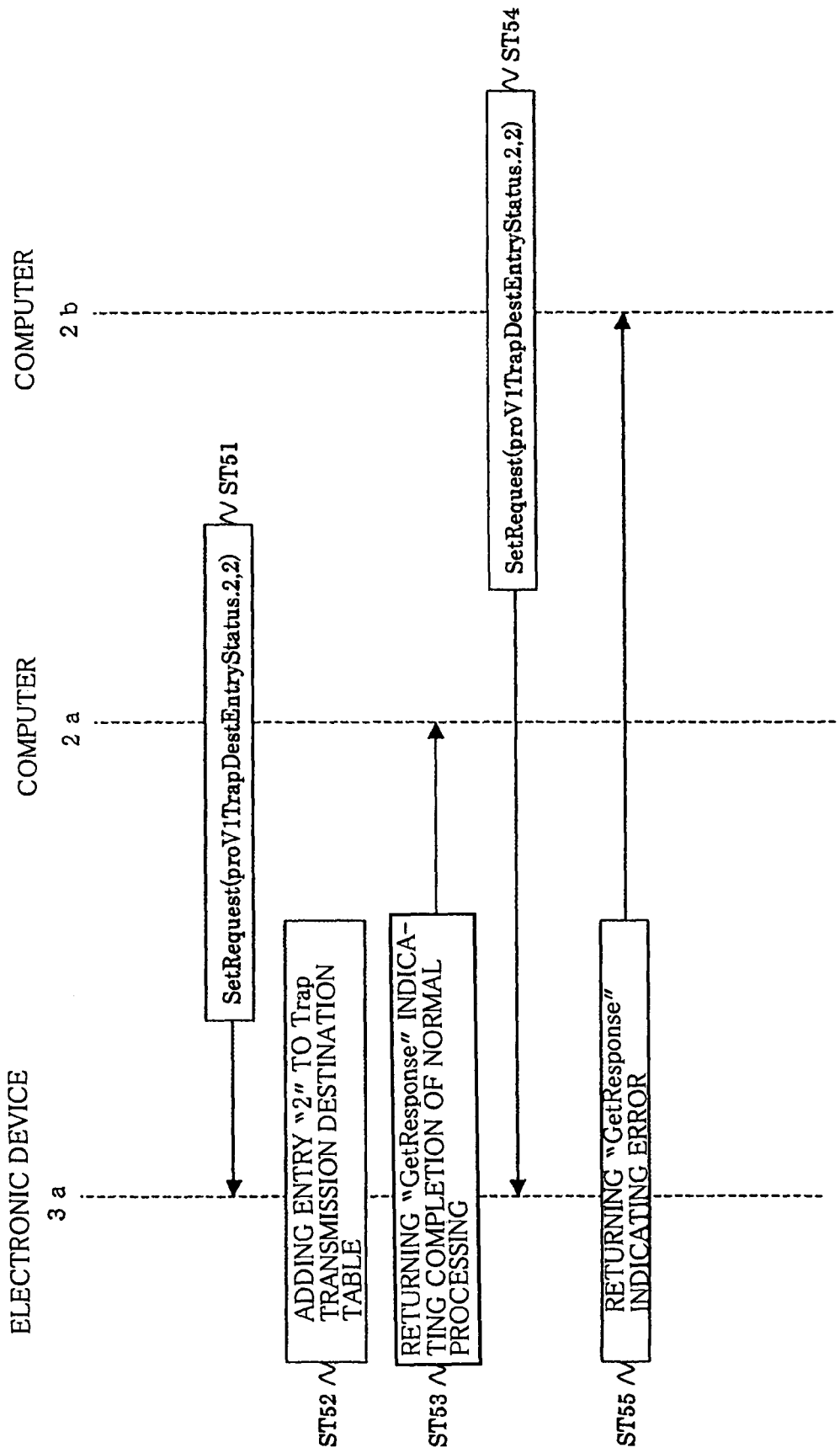
FIG. 28 is a flowchart for explaining an operation example of the case where an adding request of an entry on the second line in the Trap transmission destination table is generated from another computer almost simultaneously with that from the computer.

FIG. 28 is a flowchart for explaining the operation example.

Step ST51:

The SNMP manager 80a of the computer 2a generates a request "SetRequest" (proV1TrapDestEntryStatus. 2, 2) from the LAN_I/F 17a to the electronic device 3a via the LAN 5 and transmits the same from the LAN_I/F 17a to the electronic device 3a via the LAN 5.

Step ST52:

The SNMP agent 81a of the electronic device 3a makes an access to the ROM/RAM 21a or the HDD 22a in response to the request received from the SNMP manager 80a of the computer 2a via the LAN_I/F 26a shown in FIG. 13 in the step ST51 and adds a second entry in the Trap transmission destination table 42 shown in FIG. 16.

Step ST53:

The SNMP agent 81a transmits a response "GetResponse" indicating that normal processing has completed from the LAN_I/F 26a to the computer 2a via the LAN 5.

Step ST54:

Continuously, the SNMP manager 80a of the computer 2b generates a request "SetRequest" (proV1TrapDestEntryStatus. 2, 2) from the LAN_I/F 17a to the electronic device 3a via the LAN 5 shown in FIG. 13 and transmits the same from the LAN_I/F 17a to the electronic device 3a via the LAN 5.

Step ST55:

The SNMP agent 81a of the electronic device 3a transmits a response "GetResponse" indicating an error from the LAN_I/F 26a to the computer 2b via the LAN 5 in response to a request received from the SNMP manager 80a of the computer 2b via the LAN_I/F 26a shown in FIG. 13 in the step ST51.

As explained above, according to the communication system 1a, in the case where an adding request of the second entry in the Trap transmission destination table 42 is generated from the computer 2b almost simultaneously with that from the computer 2a, entry adding processing can be performed for the request from the computer 2a and the request from the computer 2b can be processed as an error.

Fifth Operation Example

In this operation example, the case where abnormality or a predetermined event occurs in the electronic device 3a, consequently, the electronic device 3a needs to transmits a Trap to the computers 2a and 2b will be explained.

Figure 29:
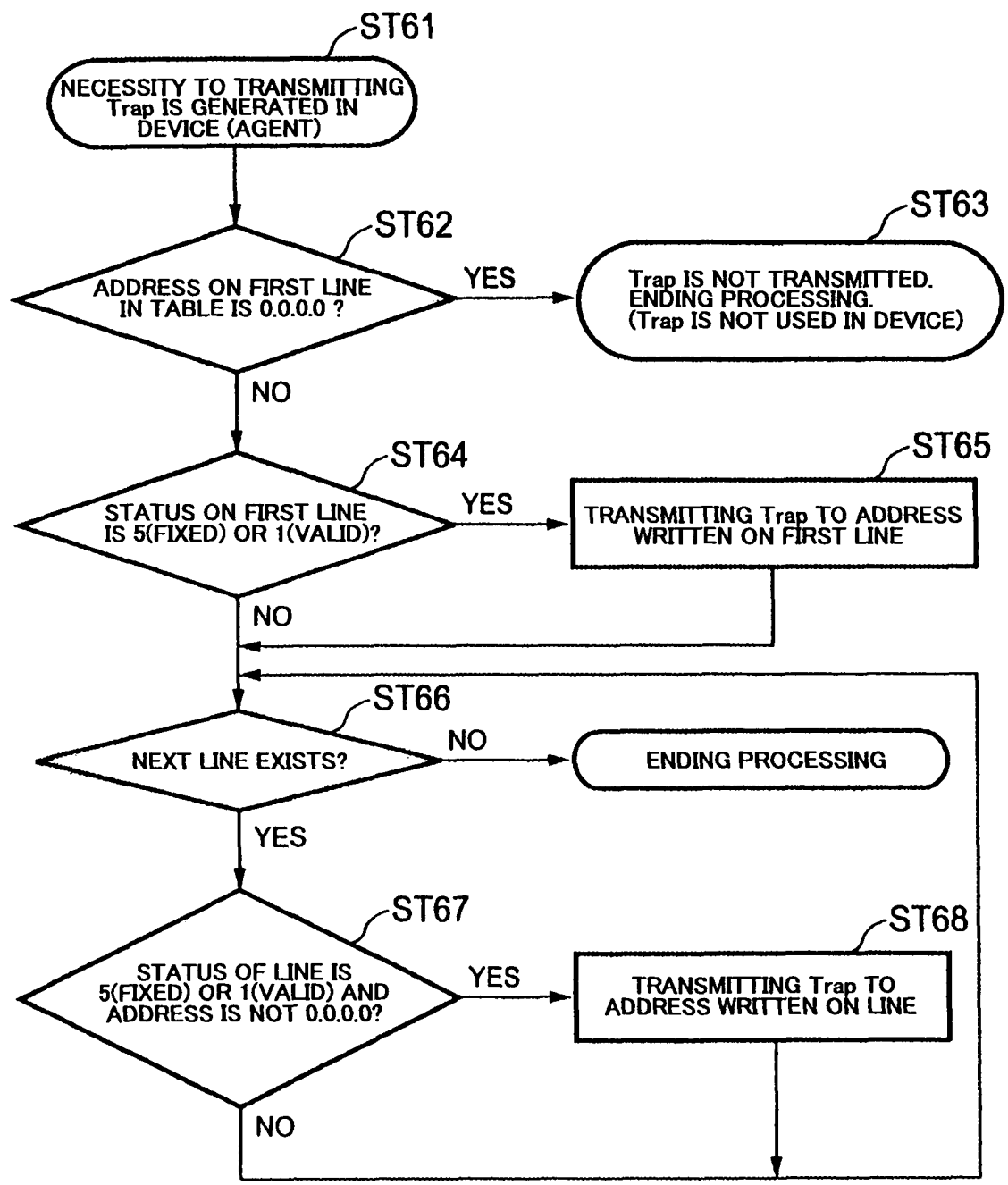
FIG. 29 is a flowchart for explaining the operation example of the case where abnormality or an event arises in the electronic device shown in FIG. 12, so a necessity arises that the electronic device transmits a Trap to the computer.

FIG. 29 is a flowchart for explaining the operation example.

Step ST61:

When the SNMP agent 81a realized as a result that the CPU 27a of the electronic device 3a shown in FIG. 13 executes a program judges that a state satisfying a condition to transmits a Trap is obtained in the electronic device 3a, it proceeds to processing in the step ST62.

Step ST62:

The SNMP agent 81a judges whether the Trap transmission address set to the first line in the Trap transmission destination table 42 is "0. 0. 0. 0" or not and proceeds to processing of the step ST63 when judged to be "0. 0. 0. 0" while not, proceeds to processing of the step ST64.

Step ST63:

The SNMP agent 81a ends the processing without transmitting a Trap.

Step ST64:

The SNMP agent 81a judges whether or not the status of the entry on the first line in the Trap transmission destination table 42 is "5 (fixed)" or "1 (valid)" and proceeds to processing of the step ST65 when judged to be "5 (fixed)" or "1 (valid)", while not, proceeds to processing of the step ST66.

Step ST65:

The SNMP agent 81a reads a Trap transmission address stored in the entry on the first line in the Trap transmission destination table 42 and transmits a Trap from the LAN_I/F 26a to the computer 2a or 2b via the LAN 5 shown in FIG. 13 by using the Trap transmission address as an address.

Step ST66:

The SNMP agent 81a judges whether a next line (entry) exists in the Trap transmission destination table 42 or not and proceeds to processing of the step ST67 when judged existing, while not, ends the processing.

Step ST67:

The SNMP agent 81a judges whether the status of the next line in the Trap transmission destination table 42 is "5" or "1" and the Trap transmission address is not "0. 0. 0. 0", and proceeds to processing of the step ST68 when judged to be not "0. 0. 0. 0", while otherwise, returns to processing of the step ST66.

Step ST68:

The SNMP agent 81a reads a Trap transmission address stored in an entry on the above mentioned next line in the Trap transmission destination table 42 and transmits a Trap from the LAN_I/F 26a to the computer 2a or 2b via the LAN 5 shown in FIG. 13 by using the Trap transmission address as an address.

As explained above, according to the communication system 1a, the IP address of the computers 2a and 2b as a transmission destination of the Trap can be automatically set to the electronic device 3a, so a trouble of a user can be reduced.

Also, according to the communication system 1a, even in the case where a request of adding entry or writing an address in the Trap transmission destination table 42 is generated from a plurality of computers 2a and 2b to the electronic device 3a, processing can be appropriately performed in an order the requests are received.

The present invention is not limited to the above embodiments.

For example, in the above embodiments, the case where one computer 2 and one electronic device 3 were connected to the LAN 5 as shown in FIG. 1 and the case where two computers 2a and 2b and one electronic device 3a were connected to the LAN 5 as shown in FIG. 12 were explained as examples, but the number of the electronic devices and the computers connected to the LAN 5 may be any.

INDUSTRIAL APPLICABILITY

The present invention can be applied to an electronic device monitoring method, etc. for performing processing of monitoring and maintenance of an electronic device connected via a network, such as a domestic LAN and the Internet.

The invention claimed is:

1. A method of monitoring the condition of an electronic device from a plurality of computers, comprising:
performing communication with said plurality of computers;
storing a communication address of said electronic device and a transmission destination table composed of a plurality of entries; and
controlling operation of said electronic device,
wherein the plurality of entries has an index number, a transmission destination communication address and a status indicating whether rewriting of the entry is possible,
wherein, when said electronic device is started up, rebooted or initialized or when the communication address of said electronic device is chanced after said electronic device was started up, rebooted or initialized last, the entries of said transmission destination table are initialized to set the transmission destination addresses of the entries to predetermined initial addresses,
receiving a first request from a first computer to change the transmission destination address of a particular entry in plurality of entries in the transmission destination table to a first address, wherein the particular entry has a status indicator that indicates whether rewriting of the transmission destination address is possible;
changing the transmission designation address of the particular entry to the first address;
transmitting a first response when the changing of the transmission designation address of the particular entry to the first address ended normally;
subsequently receiving a second request from a second computer to change the transmission destination address of the particular entry to a second address different from the first address; and
transmitting a second response to indicate an error in response to the second request including when the transmission destination address in the second request is a valid transmission destination address.

2. The electronic device as set forth in claim 1, wherein, when after a third request transmitted from the first computer for adding an entry designated by the first computer is received, and a fourth request is transmitted from the second computer for adding an entry same as the entry designated by the first computer by means of the second computer,
storing the entry designated by the first computer in the third request, transmitting a response indicating that the processing ended normally to the first computer, and then
transmitting a response indicating an error to the second computer.

3. A method of monitoring an electronic device, comprising:
connecting a plurality of computers through a network; and
monitoring the electronic device by said plurality of computers, the condition of said electronic device being monitored from said plurality of computers through said network,
wherein the electronic device accomplishes the steps of:
performing communication with said plurality of computers,
storing a communication address of said electronic device and a transmission destination table composed of a plurality of entries, and controlling operation of said electronic device,
wherein the plurality of entries has an index number, a transmission destination communication address and a status indicating whether rewriting of the entry is possible,
wherein, when said electronic device is started up, rebooted or initialized or when the communication address of said electronic device is changed after said electronic device was started up, rebooted or initialized last, the entries of said transmission destination table are initialized to set the transmission destination addresses of the entries to predetermined initial addresses,
receiving a first request from a first computer to change the transmission destination address of a particular entry in plurality of entries in the transmission destination table to a first address, wherein the particular entry has a status indicator that indicates whether rewriting of the transmission destination address is possible;
changing the transmission designation address of the particular entry to the first address;
transmitting a first response when the changing of the transmission designation address of the particular entry to the first address ended normally;
subsequently receiving a second request from a second computer to change the transmission destination address of the particular entry to a second address different from the first address; and
transmitting a second response to indicate an error in response to the second request including when the transmission destination address in the second request is a valid transmission destination address.

4. An electronic device monitoring method for an electronic device monitoring system where an electronic device is monitored from a plurality of computers through a network, comprising:
initializing, when the electronic device is started up, rebooted or initialized or when the communication address of the electronic device is changed after the electronic device was started up, rebooted or initialized last, entries of the transmission destination table to set the transmission destination addresses of the entries to predetermined initial addresses;
changing a transmission destination address of a particular entry of the transmission destination table after receiving a first request from a first computer to change the transmission destination address of the particular entry of the transmission destination table to a first address, wherein the particular entry has a status indicator that indicates whether rewriting of the transmission destination address is possible;
transmitting a first response when the changing of the transmission designation address of the particular entry to the first address ended normally;
transmitting a second response to indicate an error in response to subsequently receiving a second request from a second computer to change the transmission destination address of the particular entry to a second address, the second address being, different from the first address, including when the transmission destination address in the second request is a valid transmission destination address.

* * * * *